(12) United States Patent
Lahav

(10) Patent No.: US 12,106,141 B2
(45) Date of Patent: Oct. 1, 2024

(54) INTERRUPT HANDLING

(71) Applicant: BlackBerry Limited, Waterloo (CA)

(72) Inventor: Elad Lahav, Stittsville (CA)

(73) Assignee: BlackBerry Limited, Waterloo (CA)

(*) Notice: Subject to any disclaimer, the term of this patent is extended or adjusted under 35 U.S.C. 154(b) by 230 days.

(21) Appl. No.: 17/452,876

(22) Filed: Oct. 29, 2021

(65) Prior Publication Data
US 2023/0135214 A1 May 4, 2023

(51) Int. Cl.
G06F 9/48 (2006.01)
G06F 9/30 (2018.01)
G06F 9/54 (2006.01)

(52) U.S. Cl.
CPC .......... *G06F 9/4812* (2013.01); *G06F 9/3009* (2013.01); *G06F 9/4881* (2013.01); *G06F 9/542* (2013.01)

(58) Field of Classification Search
CPC ...... G06F 9/542; G06F 9/4881; G06F 9/3009; G06F 9/4812
USPC .................................. 718/102–103; 710/260
See application file for complete search history.

(56) References Cited

U.S. PATENT DOCUMENTS

| | | | |
|---|---|---|---|
| 5,515,538 A | 5/1996 | Kleiman | |
| 7,594,234 B1* | 9/2009 | Dice | G06F 9/526 718/100 |
| 8,479,207 B2* | 7/2013 | Plondke | G06F 9/4881 718/103 |
| 9,207,943 B2* | 12/2015 | Plondke | G06F 9/4812 |
| 10,416,897 B2* | 9/2019 | Jin | G06F 3/0685 |
| 2002/0161957 A1* | 10/2002 | Comeau | G06F 9/4812 710/260 |
| 2004/0117793 A1* | 6/2004 | Shaylor | G06F 9/4881 718/100 |
| 2006/0123420 A1 | 6/2006 | Nishikawa | |
| 2006/0130062 A1* | 6/2006 | Burdick | G06F 9/4881 718/100 |
| 2007/0136721 A1 | 6/2007 | Dunshea et al. | |
| 2011/0212761 A1* | 9/2011 | Paulsen | G07F 17/3202 345/522 |
| 2018/0293095 A1 | 10/2018 | Ishida et al. | |
| 2023/0134872 A1* | 5/2023 | Lahav | G06F 9/485 718/102 |
| 2023/0135951 A1* | 5/2023 | Lahav | G06F 9/5061 718/103 |
| 2023/0138967 A1* | 5/2023 | Lahav | G06F 9/4881 718/103 |

OTHER PUBLICATIONS

"Interrupt Service Threads—A New Approach to Handle Multiple Hard Real-Time Events on a Multithreaded Microcontroller"—by U. Brinkshulte, C. Krakowski, J. Kreuzinger, and Th. Ungerer; 6 Pages, Dated Aug. 2020 (Year: 2020).*

Elad Lahav, U.S. Appl. No. 17/452,869 entitled Thread Scheduling, filed Oct. 29, 2021 (63 pages).

(Continued)

*Primary Examiner* — Brian T Misiura
(74) *Attorney, Agent, or Firm* — Trop Pruner & Hu, P.C.

(57) ABSTRACT

In some examples, a system includes one or more hardware processors, an interrupt service thread to handle an interrupt, and a kernel scheduler to schedule the interrupt service thread as part of a collection of threads to be scheduled.

20 Claims, 10 Drawing Sheets

(56) References Cited

OTHER PUBLICATIONS

Elad Lahav, U.S. Appl. No. 17/452,871 entitled Thread State Transitions, filed Oct. 29, 2021 (63 pages).
Elad Lahav, U.S. Appl. No. 17/452,872 entitled Scheduling of Threads for Clusters of Processors, filed Oct. 29, 2021 (63 pages).
European Patent Office, Extended European Search Report for Appl. No. 22200685.0 dated Mar. 3, 2023 (12 pages).
Rainer Muller, Implementation of an Interrupt-Driven OSEK Operating System Kernel on an ARM Cortex-M3 Microcontroller, Oct. 27, 2011 (50 pages).
Nathan J. Williams, Wasabi Systems, Inc., An Implementation of Scheduler Activations on the NetBSD Operating System, Jun. 6, 2002, pp. 1-11.
QNXDeveloper Support, The QNX Neutrino Microkernel, Jan. 1, 2001 (32 pages).
Glenn A. Elliott, Real-Time Scheduling for GPUS With Applications in Advanced Automotive Systems, 2015 (322 pages).
QNX Software Systems, QNX Neutrino RTOS, System Architecture For release 6.3.0 or later, Feb. 2006 (429 pages).
Canadian Patent Office, Office Action for Appl. No. 3,172,802 dated Oct. 30, 2023 (4 pages).

* cited by examiner

INTERRUPT HANDLING

BACKGROUND

An operating system (OS) includes software that manages resources of a computer system, including hardware resources, software resources, and so forth. The OS can also provide various services for programs executing in the computer system.

The OS includes a kernel, which is responsible for various low-level tasks such as storage management, memory management, task management, and so forth.

BRIEF DESCRIPTION OF THE DRAWINGS

Some implementations of the present disclosure are described with respect to the following figures.

Figure 1:
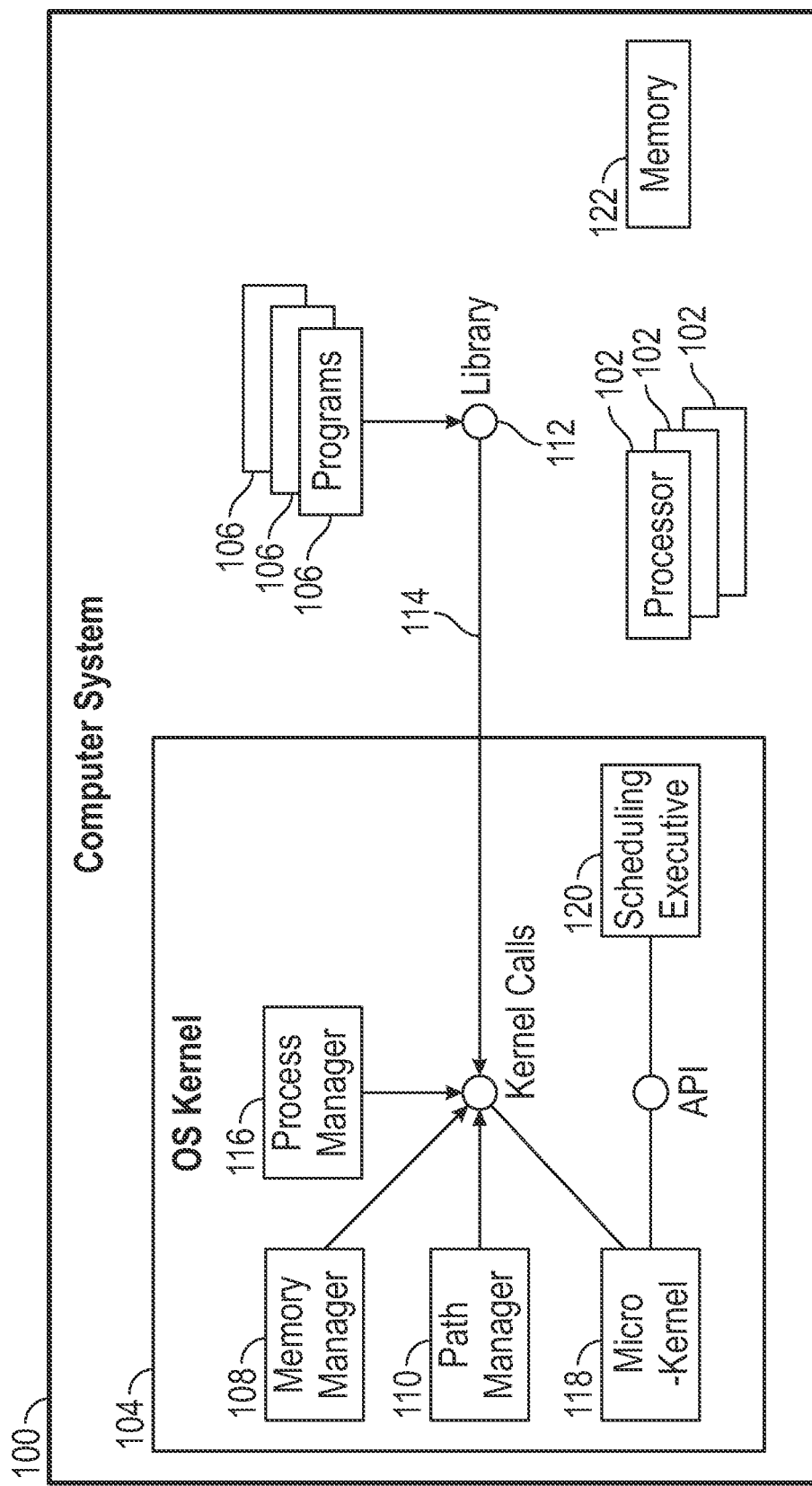
FIG. 1 is a block diagram of a computer system including an operating system (OS) kernel that has a micro-kernel and a separate scheduling executive according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Various different types of operating systems exist. An example of an OS is a QNX OS provided by Blackberry Limited. A QNX OS includes a micro-kernel, a process manager, and other components. The micro-kernel is responsible for thread management and scheduling, inter-process communication, synchronization primitives such as mutexes and semaphores, interrupt and exception handling, and so forth. The process manager handles processes, memory management, and path space.

Other types of OSes can also include micro-kernels.

A micro-kernel can execute in a computer system that includes multiple processors. As used here, a "processor" can refer to a microprocessor, a core of a multi-core microprocessor, a microcontroller, a digital signal processor (DSP), or any other type of processor.

Examples of issues associated with some micro-kernels include an ability to scale on a multi-processor computer systems, latency associated with tasks of the micro-kernel, safety associated with execution of the micro-kernel, and the complexity of the micro-kernel.

A measure of scalability is the proportion of time a system spends making forward progress across all processors. A processor is not making forward progress if (1) the processor is waiting to acquire a lock (whether by spinning or halting), or (2) the processor is repeating an operation due to a previous failure to complete that operation. The system scales well if the proportion of time spent making forward progress does not decrease significantly when more processors are added to the system (assuming the system has sufficient work to occupy all processors).

Latency refers to the period between the time an event occurs and the time the event is handled by the system. Typical cases of such events are interrupts raised by a processor, which are associated with handlers (interrupt service routines or interrupt service threads). In particular, interrupts often employ processing that cannot be done in the context of interrupt services routines, necessitating, at the very least, the scheduling of a thread. Consequently, latency is impacted by the ability of the system to perform a scheduling decision, which is tied to the availability of the scheduler and of a processor to schedule a thread on. While the latter is a characteristic of the system as a whole (number of processors, workload, relative thread priorities), and thus falls under the purview of the system's designer, the former is a property of the micro-kernel's design.

Security can refer to how vulnerable the system is to attacks, such as by malware or unauthorized users.

A complex micro-kernel is one that contains many code paths that are hard to follow, involve complex logic, and contains loops that cannot be easily proved to terminate in a timely manner. A simpler code base is one for which it is easier to establish a limit on execution time, tying to the goals of scalability and low latency. It is also safer, in that the code is better understood and is more amenable to modelling and testing.

FIG. 1 is a block diagram of an example computer system 100 that includes multiple hardware processors 102 and an OS kernel 104. In addition, the computer system 100 includes various programs 106 that can execute in the computer system 100. The programs 106 can include application programs, a file system, a network stack, and so forth. The programs 106 are executed as independent processes, each in its own address space.

The OS kernel 104 is responsible for any or some combination of the following: scheduling and synchronization, inter-process communication, memory management, timers, certain security mechanisms, process life cycle management, path-space resolution, and so forth.

Every interaction between two components in the computer system 100 involves at least one kernel call. Common examples of interactions can include opening a path, reading from a file, creating a new thread, locking a mutex, mapping memory, and so forth.

As examples, creating a new thread is a primitive kernel operation that can be serviced by a kernel call. Locking a mutex is another example of a primitive kernel operation that can be serviced by another kernel call. Other example operations can involve more complex interactions, such as involving multiple kernel calls.

Components (e.g., the programs 106) in the computer system 100 typically do not invoke kernel calls directly, but rather call wrapper functions provided by a library 112 (e.g., a C library). The library 112 responds to a wrapper function call from a component such as a program 106 by making a corresponding kernel call (114).

In addition to the memory manager 108 and the path manager 110, the OS kernel 104 further includes a process manager 116 and a micro-kernel 118. Each component of the OS kernel 104 is a logical service, and the various logical services (108, 110, 116, 118) are bundled together as a package to provide the OS kernel 104.

The micro-kernel 118 underlying the other services, is also considered a service in itself, responsible for providing the main interface exposed by the OS kernel 104 to external processes, namely kernel calls invoked via library wrappers.

The OS kernel 104 further includes a scheduling executive 120, which is a "kernel's kernel." The scheduling executive 120 can also be referred to as a "kernel scheduler," which is separate from the micro-kernel 118.

A primary role of the scheduling executive 120 is to act as a thread scheduler: the scheduling executive 120 decides which thread to run next on a current processor and puts the thread into execution. Note that in a multi-processor system, there is an instance of the scheduling executive 120 executed on each respective processor 102.

In the computer system 100, a process (which can be associated with any of the entities depicted in FIG. 1 or any other entity) is responsible for providing a service, such as a service associated with a file system, a display driver, a data acquisition module, a control module, and so forth. Within each process, there may be a number of threads. A process occupies a memory space in a memory 122 of the computer system 100. Each thread of the process executes in the memory space of the process.

The scheduling executive 120 serves as an entry point for various exceptions and asynchronous events, but only deals with those by scheduling the appropriate threads. In this sense the scheduling executive 120 is a true micro-kernel—the scheduling executive 120 does not perform any task that can be performed by a proper thread that belongs to some process (which may be a user-mode process or the OS kernel 104 itself).

Every thread in the computer system 100 is a thread associated with the scheduling executive 120, in the sense that the thread is associated with a thread data structure of the scheduling executive 120 and is scheduled by the scheduling executive 120. The scheduling executive's 120 view of a thread is restricted to those aspects that are used for basic scheduling tasks (e.g., current register values, stack area, running state, priority, etc.). Every thread in the computer system 100 is also associated with further information (the process the thread belongs to, a signal mask, whether the thread is servicing a client thread). A separate per-thread data structure is used to store such information.

All kernel code (of the OS kernel 104) outside of the scheduling executive 120 runs in thread mode. To support kernel code execution (e.g., message passing), the scheduling executive 120 provides each thread with two personae: a user persona and a kernel persona. A persona includes the minimal state information used to switch to and from executing a thread on a processor, which is typically a register set and a stack area. A thread in its user persona is restricted to the address space of its owner process, and executes only code loaded into that address space. On the other hand, a thread in its kernel persona, though it is still owned by a process, executes code in the kernel's address space.

A thread executing in its kernel persona runs in a privileged mode (e.g., (mode EL1 in the ARM architecture, or Ring 0 mode in the x86 architecture, etc.). A thread in its user persona typically runs in a non-privileged mode.

When a thread, executing in its user persona, performs a kernel call, the thread traps into the scheduling executive 120, which changes the thread's persona to the kernel persona, and the scheduling executive 120 places the thread back into execution. A thread executing in its kernel persona cannot invoke kernel calls (which would involve recursive kernel personae).

At any point in time, a processor 102 executes code in one of the following modes: the scheduling executive 120, and a thread.

In accordance with some implementations of the present disclosure, the OS kernel 104 is both multi-threaded and fully preemptable, achieving both scalability on multi-processor systems and low latency for real-time requirements. To accomplish this, the scheduling executive 120 is separated from the micro-kernel 118 into its own entity. A thread in its kernel persona is schedulable and adheres to the same rules as a thread running in the thread's user persona. For example, if a first thread is executing a given kernel call in its kernel persona at a first priority, and a second thread at higher second priority becomes ready because of an interrupt, the second thread at the higher priority will preempt the first thread at the lower priority, even though the second thread is executing user mode code (the interrupt handler). The preempted first thread becomes ready, and the first thread may be picked up by another processor (when available) to continue the given kernel call.

1. Example Use Cases

The following discusses various example use cases that involve the scheduling executive 120. Note that these example use cases are provided for illustration of some capabilities of the scheduling executive 120—other example use cases are also contemplated to be within the scope of the present disclosure.

1.1 Simple Kernel Call

Figure 2:
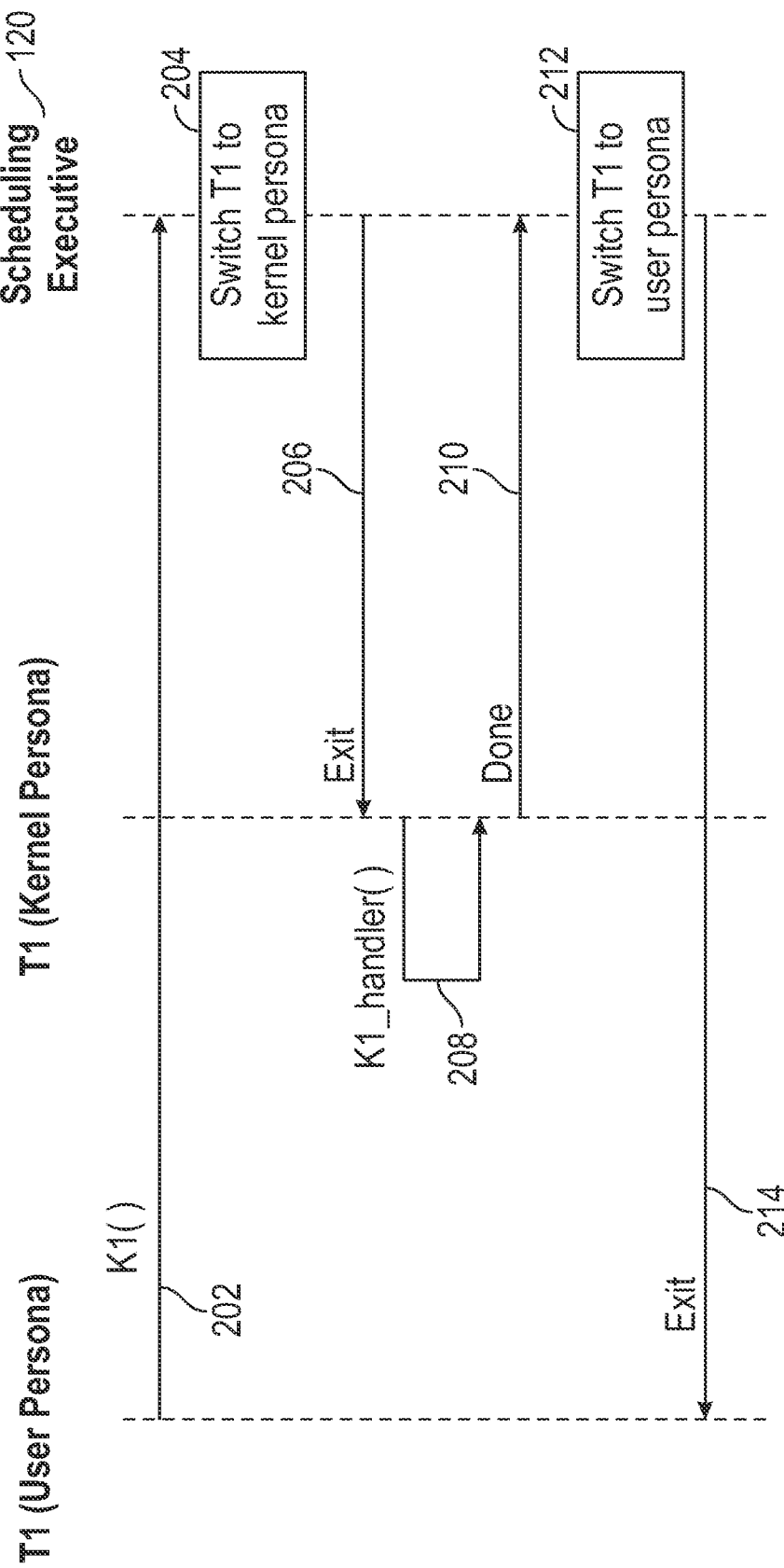
FIGS. 2-4 are flow diagrams of example uses cases relating to scheduling of threads, according to some examples.

As shown in FIG. 2, a thread T1 in its user persona invokes (at 202) a kernel call, such as K1( ) to the scheduling executive 120 (through the C library 112 of FIG. 1). The C library function implementation executes a trap instruction resulting in a synchronous exception, with the appropriate kernel call identifier and arguments. Although reference is made to a specific kernel call name in the example of FIG. 2, in other examples, other kernel calls can have other names.

The trap instruction causes a processor 102 executing the thread T1 to switch to a privileged mode and start executing an exception handler for the trap. The scheduling executive 120 stores a register context of the calling thread T1 in a per-thread area, which can be derived from the value of a designated register.

The scheduling executive 120 switches (at 204) the thread T1 to its kernel persona. As part of the switch, the thread T1's stack pointer is set to the top of the persona's stack area. The thread T1's register pointer is set to point to the persona's register area (to be used in case the thread T1 is preempted or blocks while executing in its kernel persona). The thread T1's program counter is set to the beginning of a wrapper for handling kernel calls of the micro-kernel 118. The thread T1's kernel persona registers matching the function arguments of an application binary interface (ABI) are set to the information used to execute a kernel call handler (at least the call number and arguments) for the kernel call, K1( ).

The scheduling executive 120 exits (at 206) to a thread context, which starts executing the thread T1 in its kernel persona. The kernel call handler, represented as K1_handler ( ) in FIG. 2, then executes (at 208) in the context of the thread T1.

When the kernel call handler is done, the kernel call handler traps (at 210) to the scheduling executive 120 to indicate that the kernel call handler is done. The scheduling executive 120 switches (at 212) the thread T1 back to its user persona. Note that the persona's register set still reflects the state of the thread T1 at the beginning of this use case.

The scheduling executive 120 exits (at 214) to the thread context, which resumes the execution of the thread T1 in its user persona.

1.2 Blocking Kernel Call

Figure 3:
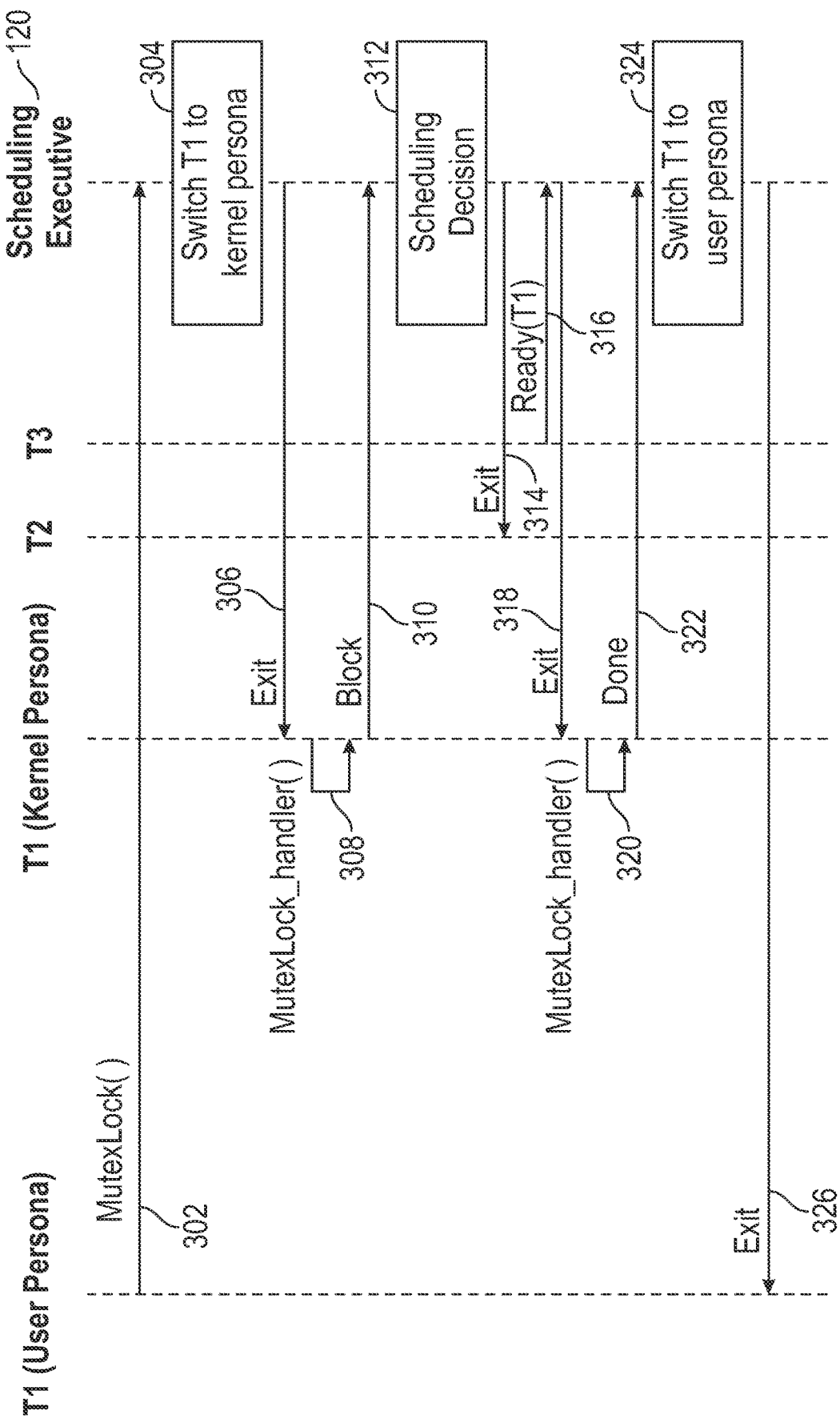

As shown in FIG. 3, a user-mode thread T1 (in its user persona) invokes (at 302) a kernel call, such as MutexLock ( ), on a mutex that is currently locked by another thread (e.g., T3). The C library function implementation executes a trap instruction resulting in a synchronous exception, with the appropriate kernel call identifier and arguments. Although reference is made to a specific kernel call name in the example of FIG. 3, in other examples, other kernel calls can have other names.

Tasks 304, 306, and 308 are similar to respective tasks 204, 206, and 208, except task 308 is performed by a kernel call handler, MutexLock_handler( ), for the kernel call, MutexLock( ).

The kernel call handler, MutexLock_handler( ), determines that the thread T1 has to block, waiting on some future event (i.e., the release of the mutex that is currently locked by the thread T3). The kernel call handler, MutexLock_handler( ), marks the thread T1 in its kernel persona as waiting for the event, and the kernel call handler, MutexLock_handler( ), traps (at 310) to the scheduling executive 120 to indicate that the thread T1 in its kernel persona has to block.

The scheduling executive 120 observes that the thread T1 is marked for blocking. In response, the scheduling executive 120 makes (at 312) a scheduling decision among all ready threads in a ready queue that can run on a current processor 102 (that was executing the thread T1). A "ready queue" refers to a queue in which threads ready for execution are placed for scheduling by the scheduling executive 120.

The scheduling executive 120 switches the processor mode to start running the chosen thread (e.g., T2), by exiting (at 314) to a thread context of the thread T2, which initiates execution of the thread T2.

At a later time, the event (mutex release) on which the thread T1 in its kernel persona has blocked occurs, and another thread (e.g., T3) marks (at 316) the blocked thread T1 as ready to the scheduling executive 120.

In response, the scheduling executive 120 exits (at 318) to the thread context of the thread T1, to resume execution of the thread T1 in its kernel persona. The kernel call handler, MutexLock_handler( ), resumes execution (at 320) from the blocking trap.

When the kernel call handler, MutexLock_handler( ), is done, the kernel call handler traps (at 322) to the scheduling executive 120 to indicate that that the thread T1 is done.

The scheduling executive 120 switches (at 324) the thread T1 back to its user persona. Note that the persona's register set still reflects the state of the thread T1 at the beginning of this use case.

The scheduling executive 120 exits (at 326) to the thread context of the thread T1, which resumes the execution the thread Ti in its user persona.

1.3 Kernel Thread Blocks

This use case is distinct from the previous one, in that it is not the kernel call that blocks, but a thread running in its kernel persona. This can happen when a kernel call has to wait on some event before the kernel call can proceed, for example when attempting to acquire a lock protecting a shared kernel resource.

Figure 4:
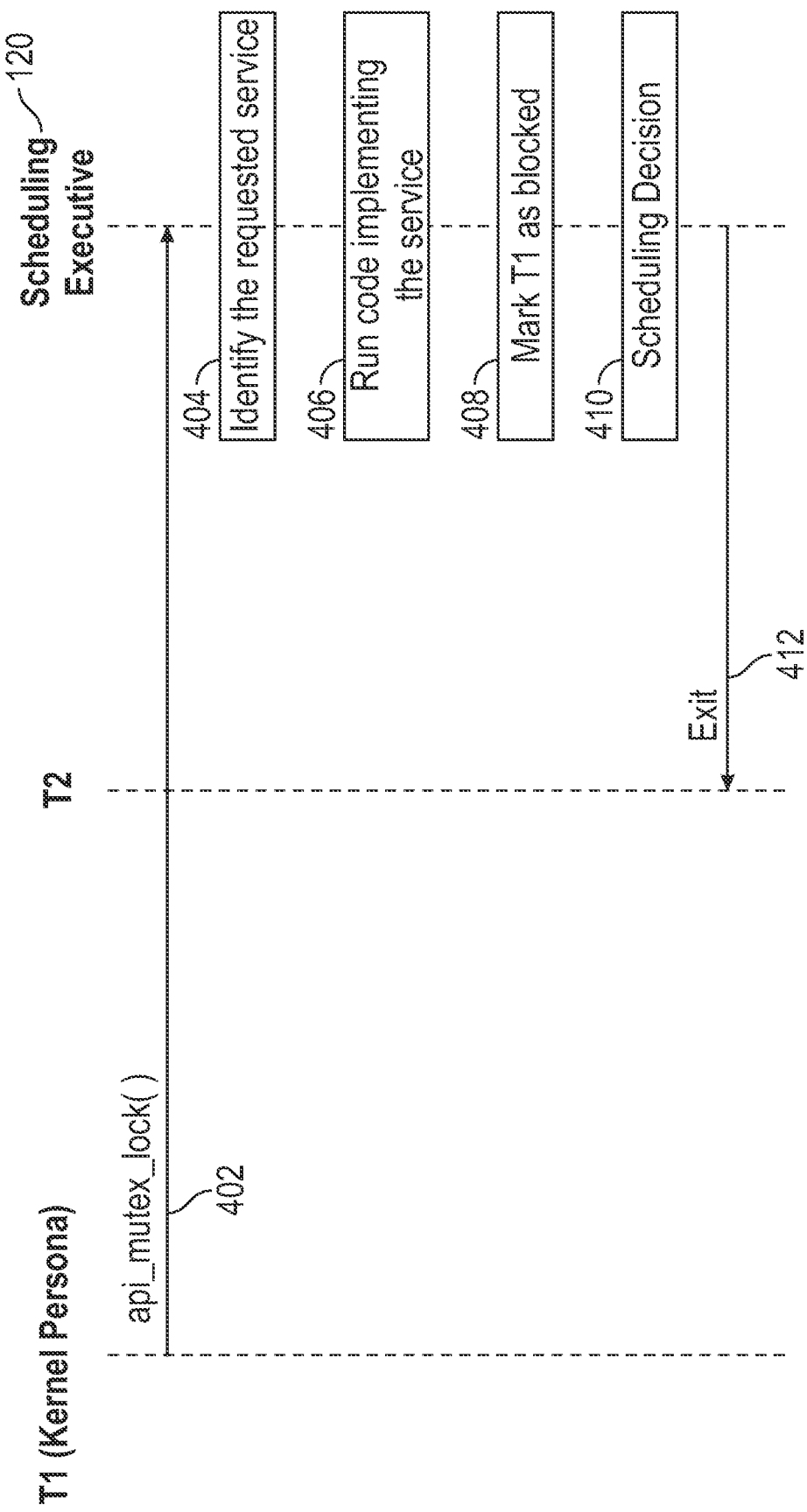

As shown in FIG. 4, a thread T1 running in its kernel persona calls (at 402) an application programming interface (API) function in an API of the scheduling executive 120. For example, the API function called can be api_mutex_lock( ).

The called API function traps to the scheduling executive 120. The scheduling executive 120 stores the register context of the calling thread T1. Note that this area corresponds to the register set of the thread T1's kernel persona. The thread T1's user persona register set remains untouched.

The scheduling executive 120 identifies (at 404) the requested service (e.g., locking a mutex) requested by the API function call.

The scheduling executive 120 runs (at 406) the code implementing this service. The scheduling executive 120 marks (at 408) the calling thread T1 in its kernel persona as blocked.

The scheduling executive 120 makes (at 410) a scheduling decision among all ready threads in a ready queue that can run on the current processor (that was executing the thread T1).

The scheduling executive 120 switches the processor mode to start running a chosen thread T2, by exiting (at 412) to a thread context of the thread T2, which initiates execution of the thread T2.

When the mutex is later unlocked, a process similar to tasks 316, 318, 320, and 322 can be performed to resume the thread T1 in its kernel persona.

1.4 Kernel Call that Unblocks Other Threads

A kernel call from a thread in its kernel persona can result in one or more threads switching their state from blocked to ready (for execution). For example, a kernel call to unlock a mutex readies a first waiting thread, while another kernel call can unblock all waiting threads.

As soon as a thread is marked as ready the thread can be scheduled on a different processor. Also, the thread may end up being scheduled on the same processor if a scheduling decision is made before the kernel call completes (e.g., as a result of an interrupt).

The sequence of tasks for unblocking other threads mostly follows the one described in sub-section 1.1. Every time a kernel call handler makes a thread ready the kernel call handler invokes a call to the scheduling executive 120 to put the thread on a ready queue, without making a scheduling decision (i.e., without preemption).

1.5 Synchronous Exceptions

A thread can generate a synchronous exception by either executing architecture-specific instructions, or by executing an instruction that the processor cannot handle without the intervention of the OS (e.g., an address reference causing a page fault or a floating point instruction while a floating point unit (FPU) is disabled). When the exception is raised by the processor, execution is transferred automatically to the scheduling executive 120 by a switch to a privileged mode and a jump to a known address (e.g., the exception vector).

The scheduling executive 120 handles directly only those exceptions that invoke the scheduling executive's 120 own facilities. These facilities are derived from the role the scheduling executive 120 plays, which is restricted to dispatching threads. Examples of such facilities include making a new thread ready and locking a mutex. All other synchronous exceptions, including most kernel calls and faults, are handled by re-scheduling the current thread in its kernel persona or by scheduling some dedicated thread.

Upon the execution of some instruction, the processor raises a synchronous exception. For example, an exception can be raised if a thread attempts to access an invalid address, or attempts to write to a valid address for which the associated process has read-only permissions.

The sequence for handling an exception is similar to that for a kernel call. The main difference is that the exception handler sets the thread's kernel mode persona to start at a different entry point.

2. Scheduling

A primary role of the scheduling executive 120 is to schedule other activities, arbitrating access to a processor among competing tasks. Scheduling by the scheduling executive 120 is made relatively simple in order to support a deterministic execution time within the scheduling executive 120. More complex scheduling policies (such as round-robin, sporadic scheduling, etc.) can be implemented outside of the scheduling executive 120 by building on the primitives the scheduling executive 120 provides.

The scheduling executive 120 is concerned with placing threads into execution on a given processor 102. A thread is, at a minimum, a set of values that can be loaded into the processor's registers. As such, a thread represents a sequential execution context that can be preempted and resumed (potentially on other processors).

As is typical of a real-time operating system, the scheduling executive 120 provides a two-dimensional scheduler, in which threads are scheduled first by priority and then by time of arrival. Other scheduling policies can be implemented by a combination of the following operations: changing thread priorities, enqueuing threads at either the beginning or the end of the priority list, and forcing a thread to yield to the one behind it on the same priority list.

The scheduling executive 120 schedules, for execution, threads to run in an address space of the OS kernel 104 according to respective priorities (and possibly also times of arrivals) associated with the threads. In response to scheduling a given thread for execution responsive to a kernel call from the given thread, the scheduling executive 120 can switch the given thread from its user persona to its kernel persona.

In response to an event, the scheduling executive 120 can also preempt a thread in the kernel persona of the thread that is actively executing.

In some examples, a given thread in the kernel persona of the given thread is schedulable and adheres to the same rules as the given thread in the user persona of the given thread. For example, the rules can govern when and how a thread can transition between different states, when a thread is to block on an event, and so forth.

In some examples, a given thread in its kernel persona when preempted was executing on a first processor 102, where the preemption includes preempting a kernel context associated with the thread in the kernel persona. A kernel context associated with the thread can include a register set containing current register values, a stack area for the thread, a priority of the thread, and other information, for example. After preemption, the scheduling executive 120 can resume the preempted thread on a second processor 102 responsive to the second processor 102 becoming available, where the resumption of the preempted thread migrates the kernel context associated with the thread in the kernel persona to the second processor 102.

In further examples, the scheduling executive 120 can resume a kernel context of the preempted thread after a higher priority task has completed execution.

In some examples, the scheduling executive 120 employs mutexes in performing the scheduling, where a mutex allows descheduling of a given thread from a processor 102 while the given thread waits to acquire the mutex. Descheduling the given thread can refer to placing the given thread in a wait state or a blocked state, while other threads can continue to run.

In some examples, each respective mutex of the mutexes is associated with a list of threads waiting on the respective mutex.

3. Mutexes

Mutexes are used to synchronize threads in a multithreaded environment. Access to the synchronization primitives including mutexes of the scheduling executive 120 are available to threads running in a privileged mode (i.e., in their kernel persona). Threads running in their user persona are not able to access the synchronization primitives associated with the scheduling executive 120.

A mutex extends a spin lock by descheduling a thread while the thread waits to acquire the lock. This allows a processor to run another thread instead, maximizing processor utilization.

A mutex allows only one thread to execute in a critical section, thus preventing concurrent use or manipulation of shared resources, such as the processors 102.

Mutexes are important when an operation governed by a lock is not guaranteed to be short enough to allow a processor 102 that executes the operation to disable preemption without affecting overall system behavior.

Holding a lock while preemption is enabled introduces the risk of priority inversion: the thread that holds the lock can be prevented from completing its operation governed by the lock by a higher-priority thread. Any other thread waiting for the lock will thus also be prevented from making forward progress. Effectively, this reduces the priority of waiting threads to the priority of the thread that holds the lock. A way to address this issue is by configuring mutexes used by the scheduling executive 120 to use a priority inheritance protocol. According to the priority inheritance protocol, the priority of a thread holding a lock is adjusted to that of the highest-priority waiting thread.

The implementation of the priority inheritance protocol specifies that the thread that currently holds the mutex (its owner process) be known. Consequently, the lock's value can no longer be a simple Boolean value as with a spin lock, but includes information to identify the owner. Additionally, a mutex is associated with a list of waiters, such that the scheduling executive 120 can determine which thread to wake up when a mutex is unlocked, and the highest-priority waiter can be identified in order to implement the priority inheritance protocol.

In some examples, the scheduling executive 120 provides a mutex implementation that is exclusively for use by kernel threads (including any thread in its kernel persona and a process manager thread in its user persona). As such, the mutex implementation can assume a cooperative, well-behaved environment—threads are not expected to corrupt the state of the mutex, hold a mutex indefinitely, or abort while waiting on a mutex.

The mutex implementation also provides the following properties:

Mutual exclusion: at most one thread executes within a critical section protected by a mutex of the scheduling executive 120.

No starvation: the highest priority thread waiting on a mutex of the scheduling executive 120 will eventually acquire it.

Fairness: a mutex of the scheduling executive 120 is acquired by the highest-priority, longest-waiting thread.

4. Clusters

In some examples, the scheduling executive 120 is able to restrict threads to specific processors 102. Such restrictions are applicable in various situations.

A first situation involves hardware constraints, e.g., when a thread has to access a register that is specific to a particular processor 102.

A second situation involves asymmetric multiprocessing, in which different processors 102 have different performance and power consumption characteristics. Certain threads are designated to run in higher performance processors, while other threads are designated to run on lower performance processors (processors with lower power consumption).

A multi-processor OS can allow each thread to be associated with an affinity or run mask value that restricts the thread to run on any subset of the available processors. Nevertheless, such a flexible mechanism complicates scheduling, as one or more queues have to be searched for a thread that can run on a particular processor. In a scheduler that uses a single queue, the upper limit on such a search is the number of threads in the system, while a scheduler that employs multiple ready queues would use $2^{num\_cpus}$ queues to represent all different combinations (where num_cpus represents the number of processors 102).

However, supporting the common use cases for thread affinity does not require supporting all possible processor subsets. The most common subsets are all processors and one processor. Additionally, some systems may employ a handful of partitions to represent processors of a particular class (e.g., in order to support ARM's big.LITTLE architecture, a partition of higher performance processors, a partition of lower performance processors, etc.).

In accordance with some implementations of the present disclosure, the scheduling executive 120 supports these common processor partitions with the notion of scheduler clusters, each representing a respective subset of the available processors 102. Every processor 102 is associated with a list of clusters in which the processor 102 participates. In some examples, by default, each processor 102 is a member of the following two clusters:

$C_{all}$: the set of all processors.
$C_{self}$: the subset containing just this processor.

A system integrator (e.g., a system administrator or other user or a program or machine) can define more clusters to represent processor topologies or characteristics that are of interest to software running on a system. For example, in a system with four (or a different number of) low-power processors and two (or a different number of) high-power processors, each processor 102 can be a member of either $C_{low}$ (subset of low-power processors) or $C_{high}$ (subset of high-power processors), for a total of three clusters per processor: (1) $C_{all}$, (2) $C_{self}$ and (3) $C_{low}$ or $C_{high}$.

More generally, every processor is a member of the following clusters: $C_{all}$, $C_{self}$ and a fixed quantity of additional clusters to allow the scheduling executive 120 to make consistent (constant time) scheduling decisions for execution of threads with different affinities.

Clusters define the possible affinity values for threads: only such values that correspond to defined clusters are valid and accepted by the scheduling executive 120. Every thread is associated with exactly one cluster at any point in time. This association defines the thread's affinity.

4.1 Data Structures for Clusters

Figure 5:
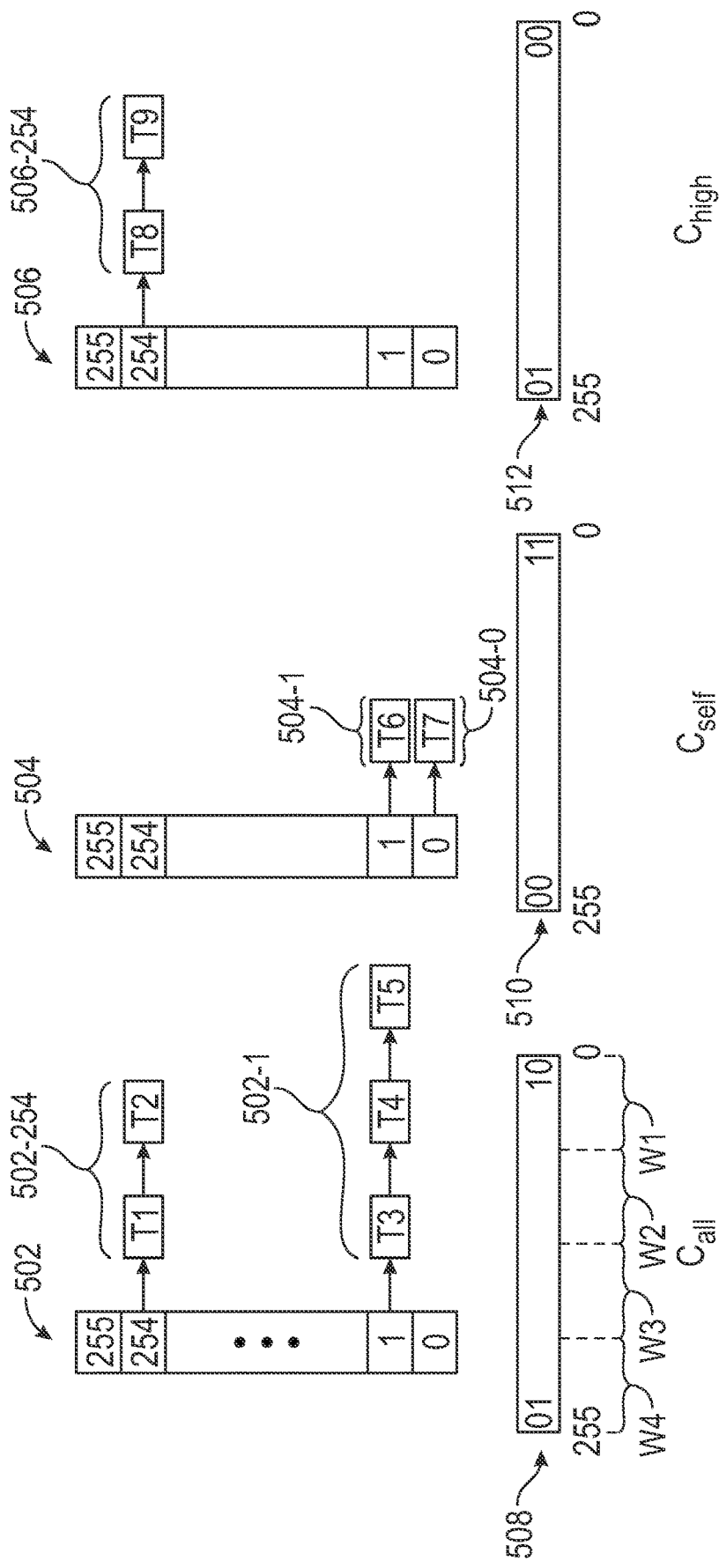
FIG. 5 is a block diagram of data structures for ready queues of clusters, according to some examples.

Each cluster is represented by a respective data structure for a ready queue. As shown in FIG. 5, three data structures 502, 504, and 506 for ready queues of three corresponding clusters $C_{all}$, $C_{self}$, and $C_{high}$ are depicted. Although FIG. 5 depicts an example where threads can have an affinity with processors of the three clusters shown, in other examples, more clusters may be involved.

Each data structure 502, 504, and 506 includes an array of linked lists. In the example of FIG. 5, the array of linked lists of each data structure 502, 504, or 506 has 256 elements (array elements 0 to 255). Each array element represents a single priority level, and each array element refers to or includes a corresponding linked list of (zero or more) threads. The length of a linked list for a corresponding array element depends on the quantity of threads having the priority level of the corresponding array element and currently ready for scheduling. If there are no threads having a given priority level that are ready for execution, then the length of the linked list for the associated given array element is zero.

In the example of FIG. 5, an array element 254 in the data structure 502 is associated with a linked list 502-254 with two ready threads T1 and T2 (that have priority level 254), and an array element 1 in the data structure 502 is associated with a linked list 502-1 with three ready threads T3, T4, and T5 (that have priority level 1). In some examples, a thread assigned a higher priority level (e.g., 254) has a higher priority than a thread assigned a lower priority level (e.g., 1). It is assumed that the linked lists for the other array elements of the data structure 502 do not have any ready threads.

Similarly, an array element 1 in the data structure 504 is associated with a linked list 504-1 with one ready thread T6 (that has priority level 1), and an array element 0 in the data structure 504 is associated with a linked list 504-0 with one ready thread T7 (that has priority level 0). An array element 254 in the data structure 506 is associated with a linked list 506-254 with two ready threads T8 and T9 (that have priority level 254—the same priority level as threads T1 and T2 in the data structure 502)

In each linked list, threads are sorted by the order in which they become ready (with the exception of threads explicitly added to the head of a linked list). For example, in the linked list 502-1, thread T3 was added first and thread T5 was added last.

A cluster is also associated with a bit mask that indicates which of the priority levels has a non-empty list. A bit mask 508 is associated with the data structure 502 for the cluster $C_{all}$, a bit mask 510 is associated with the data structure 504 for the cluster $C_{self}$, and a bit mask 512 is associated with the data structure 506 for the cluster $C_{high}$. Each bit mask 508, 510, or 512 has 256 bits that correspond to the 256 array elements of the corresponding data structure 502, 504, or 506. A bit in the bit mask is set to a first value (e.g., 0) if the corresponding array element in the data structure is empty, and is set to a different second value (e.g., 1) if the corresponding array element in the data structure is non-empty. For example, in the bit mask 508, bits 1 and 254 have the value 1 since array elements 1 and 254, respectively, of the data structure 502 have non-empty linked lists. The remaining bits of the bit masks have the value 0 since the remaining array elements of the data structure 502 have empty linked lists.

In some examples, each bit mask may be divided into multiple words (e.g., a word can have 64 bits or a different length) to allow a faster search of the corresponding data structure by the scheduling executive 120. For example, the bit mask 508 has four words W1, W2, W3, and W4.

More generally, a ready queue for a given cluster of processors has a data structure that is associated with lists of threads, where each list of threads is associated with a priority level indicated by the data structure, and each list of threads is sorted in an order of when the threads became ready for execution. A "list" can refer to any information that specifies a collection of zero or more threads arranged in some order.

Figure 6:
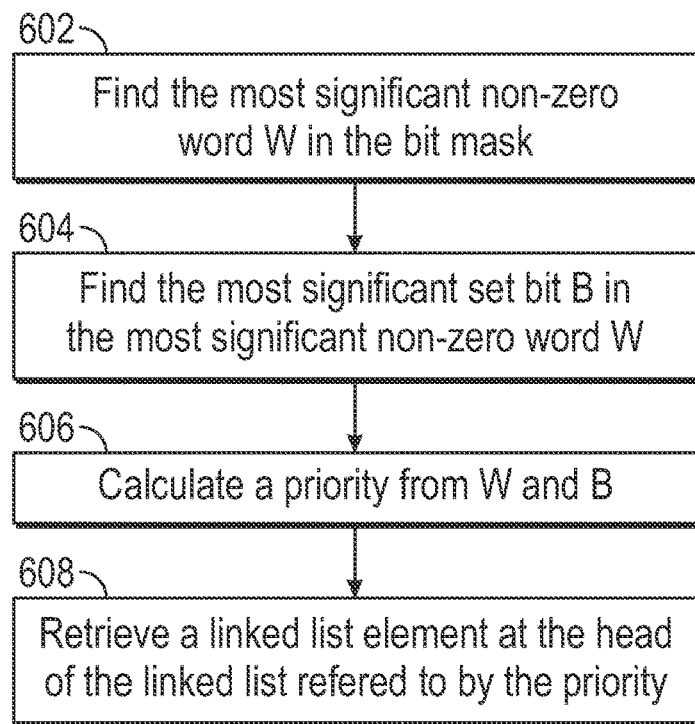
FIG. 6 is a flow diagram of selecting a thread from ready queues associated with multiple clusters, according to some examples.

In some examples, to determine the next thread eligible to run within a cluster, the following tasks can be performed. As shown in FIG. 6, the scheduling executive 120 finds (at 602) the most significant non-zero word W in the corresponding bit mask. In FIG. 5, the bit mask 508 has four words W1, W2, W3, and W4, where W4 is the most significant word since it is associated with the most significant bits (192 to 255) of the bit mask 508, and W1 is the least significant word since it is associated with the least significant bits (0 to 63).

In the bit mask 508, word W4 is non-zero, since bit 254 has the value 1, and word W1 is non-zero since bit 1 has the value 1. Words W3 and W2 are zero words since all their bits are set to 0.

The most significant non-zero word W provides an indication that a priority array element in the corresponding section of the data structure has a non-empty linked list. Thus, word W4 being non-zero indicates that at least one of array elements 192 to 255 in the data structure 502 has a non-zero linked list.

The scheduling executive 120 then finds (at 604) the most significant set bit B (bit set to 1) in the most significant non-zero word W. In the example of FIG. 5, the most significant set bit B in word W4 is bit 254.

The scheduling executive 120 then calculates (at 606) a priority π from the two values W and B: π←W*|W|+B, where |W| is the number of bits in a word. The priority π is an index referring to the specific array element (having the priority π) in the corresponding data structure with threads ready for execution. For example, for the data structure 502 in FIG. 5, the priority level π calculated based on bit 254 in the word W4 of the bit mask 508 being set would be 254 (to identify array element 254 in the data structure 502).

The scheduling executive 120 retrieves (at 608) the linked list element at the head of the linked list referred to by the index π.

Assuming hardware in the computer system 100 supports simple and fast instructions for finding the first set bit in a word of a bit mask (or some variant such as finding a first clear bit or a number of leading zeros), the above tasks can be performed in constant time.

4.2 Algorithm for Finding a Thread to Schedule for Execution

The following describes a scheduling algorithm used by the scheduling executive 120 for scheduling ready threads for execution from the ready queues of multiple clusters.

Let P be the processor on which a scheduling decision is to be made by the scheduling executive 120, and let C(P) be the set of clusters of which P is a member. For a cluster C, the thread at the beginning of the highest non-empty priority list is denoted by $T_C$. For a thread T the priority of the thread is denoted by $\pi(T)$.

In accordance with some implementations, timestamps may be associated with each thread added to a ready queue for a corresponding cluster. The timestamp includes a time at which the thread was added to the ready queue (or equivalently the time the thread became ready for execution). Associating timestamps with threads added to the ready queues for the corresponding clusters allows the scheduling algorithm implemented by the scheduling executive 120 to break ties among clusters with equal highest priority threads in a way that adheres to the rules of first-in-first-out (FIFO) scheduling. The timestamps associated with the threads enable FIFO scheduling among multiple clusters.

The timestamp for a thread T is denoted as $\rho(T)$. The following sets forth an example FIFO-aware scheduling algorithm.

| FIFO-aware scheduling algorithm. |
| --- |
| T ← NIL<br>for all cluster $C_i$ in C(P) do<br>  if T = NIL or $\pi(T_{c_i}) > \pi(T)$ then<br>    T ← $T_{c_i}$<br>  else if $\pi(T_{c_i}) = \pi(T)$ and $\rho(T_{c_i}) < \rho(T)$ then<br>  end if<br>end for |

The timestamp $\rho(T)$ is set whenever the thread T is placed in the ready queue. Typically, the thread T is placed at the end of its priority list (a linked list), and the timestamp is set to the current time. However, when a thread T is preempted by a higher priority thread then it is expected to resume execution when no other higher priority thread is ready. To maintain the thread's position at the head of the priority list among all clusters it is put at the head of its priority list, and it receives a negative timestamp value. Such a negative timestamp value means that the condition $\rho(T) < \rho(T_i)$ is true for all threads $T_i$ that were added at the tail of their respective priority list, even if these became ready before the preemption of T.

The use of clusters allows for a scheduling algorithm with a complexity of O(N), where N is the maximum number of clusters for any processor. In the example above every processor is a member of exactly three clusters, when the scheduling executive 120 has to select a thread for a processor P the scheduling executive 120 only has to consider at most three candidates, which are the threads at the front of the highest non-empty priority list for each cluster including P. Assuming the number of clusters remains very small, even for large systems, this algorithm has a constant worst-case run time.

In some examples, a kernel scheduler (e.g., the scheduling executive 120 discussed above) associates each respective processor of the plurality of processors with a collection of clusters (e.g., $C_{all}$, $C_{self}$, and $C_{high}$ or $C_{all}$, $C_{self}$, and $C_{low}$). Each cluster of the collection of clusters represents a respective different subset of the plurality of processors, and the respective processor is a member of each cluster of the collection of clusters.

For each corresponding cluster of the collection of clusters, the kernel scheduler maintains a data structure (e.g., 502, 504, or 506 in FIG. 5) associated with a ready queue of the kernel scheduler. The data structure includes elements representing thread priorities, wherein an element of the data structure is associated with an ordered list of threads (e.g., linked list of threads such as 502-1, 502-254, 504-0, 504-1, and 506-254 in FIG. 5) in the ready queue.

In some examples, the kernel scheduler traverses the data structures for corresponding clusters of the collection of clusters to identify a thread in a ready queue to schedule for execution.

In some examples, a first processor is associated with a first collection of clusters, the first collection of clusters including a first cluster that includes all processors of the plurality of processors (e.g., $C_{all}$), a second cluster that includes only the first processor (e.g., $C_{self}$), and a third cluster that includes processors having a first characteristic (e.g., $C_{high}$).

A second processor is associated with a second collection of clusters, the second collection of clusters including the first cluster that includes all processors of the plurality of processors (e.g., $C_{all}$), a fourth cluster that includes only the second processor (e.g., $C_{self}$), and a fifth cluster that includes processors having a second characteristic different from the first characteristic (e.g., $C_{low}$). A characteristic of a processor can refer to a performance level (e.g., high performance, low performance), a power consumption (high power, low power), an architecture (e.g., big, LITTLE), and so forth.

In some examples, the elements of each data structure are arranged in an order of thread priorities, and the kernel scheduler identifies, according to the order of thread priorities of the elements in each data structure, the thread in the ready queue to schedule for execution.

In some examples, each thread in the ordered list of threads is associated with a timestamp corresponding to a time the thread was placed in a ready queue, and the kernel scheduler identifies the thread in the ready queue to schedule for execution further based on the timestamps.

In some examples, the threads in the ordered list of threads are arranged in order according to when the threads were placed in the ready queue.

In some examples, in response to a preemption of a thread scheduled for execution from the ordered list of threads, the kernel scheduler assigns a specified timestamp (e.g., a negative timestamp) to the preempted thread to maintain the preempted thread at a beginning of the ordered list of threads.

In some examples, each respective cluster of the collection of clusters is further associated with a mask (e.g., 508, 510, 512 in FIG. 5) indicating which elements of the data structure for the respective cluster are associated with non-empty ordered lists of threads. A non-empty ordered list of threads includes one or more threads.

In some examples, the kernel scheduler uses the mask to search the respective cluster for a thread to schedule, where the mask is to produce an index (e.g., $\pi$) referring to an element of the respective cluster, the element referred to by the index associated with a non-empty ordered list of threads.

5. Waiting and Blocking

In accordance with some implementations of the present disclosure, a distinction is made between blocking and waiting of threads.

In a typical kernel, a thread waiting for an event is also considered to be blocked until that event arrives. However, with the scheduling executive 120 according to some implementations of the present disclosure, a thread transitions itself to a blocked state, while executing in its kernel persona. The act of preparing a thread such that the thread starts waiting for an event is performed by the same thread while the thread is still running. Thus, an interval exists between a point in time when the thread starts logically waiting for an event (the thread is in the wait state) and the time the thread stops running (and has transitioned to the blocked state). In the absence of a single kernel lock this interval can be observed by the scheduling executive 120 as well as by other threads.

The distinction between the wait state and the blocked state becomes even more pronounced in the presence of two-tier scheduling, where the OS kernel 104 can make certain decisions whose outcome is not immediately exposed to the scheduling executive 120. For example, a thread ("sending thread") executing a MsgSend( ) kernel call (to send a message) can discover that no receiving thread is available on a channel. A "channel" is a communication endpoint advertised by a server process. A client process establishes a connection to the channel, and once the connection is established, the client process can send messages and other information over the channel, which the server process receives.

When the sending thread discovers that no receiving thread is available on the channel, the sending thread adds itself to the connection's send queue. Once the sending thread is on that queue the sending thread is logically waiting for the channel, even though the sending thread is still running. The OS kernel 104 then transitions the sending thread to a STATE_SEND state. But this transition does not affect the scheduling executive's 120 view of the sending thread's state—that only happens when a trap occurs to inform the scheduling executive 120 that the sending thread should block.

Note that since threads running in their kernel persona can be preemptable (with the exception of very short periods when interrupts are disabled), the period between a thread starting to wait for an event and blocking can be arbitrarily long. As will be described below, it is possible for a thread to lose its waiting status before it reaches the point of blocking.

5.1 Events

A standard behavior of a blocking kernel call has the calling thread waiting for an event, and another thread signaling that the condition for that event has been met. Since the event itself is usually associated with some kernel object (e.g., a mutex or a channel), it is easy to synchronize between the two threads. Such events are referred to as expected events. When a thread declares itself as waiting for an event the event is considered an expected event.

Nevertheless, under some circumstances a kernel call has to terminate early due to an event that may not be related to the event for which the call blocks. Such events are referred to as unexpected events. Examples of unexpected events include process termination (to terminate a process), an object associated with the event is destroyed by another thread, expiration of a timeout timer, a signal delivered to the thread, and so forth.

With the scheduling executive 120 and use of fine-grained locking the state of a thread to which an event is delivered cannot be determined without the risk of race conditions. The thread that delivers the unexpected event is not necessarily the same thread which provides the expected event on which the caller thread is waiting. Therefore, there are three threads that have to be synchronized in this scenario. Furthermore, the unexpected event may not be tied in any way to the kernel object associated with the expected event. Consider the following scenario:

Thread T1 in process P1 calls MsgSend( ) to send a message on channel C.

Thread T2 in process P2 calls MsgReceive( ) on channel C.

Thread T3 in process P1 calls ThreadDestroy( ) with an argument to destroy all threads in P1.

Note that thread T3 does not destroy T1 directly (a thread destroys itself), but thread T3 has to ensure that thread T1 is not blocked indefinitely on the message. Thread T1 should be made ready and abort the call.

Figure 7:
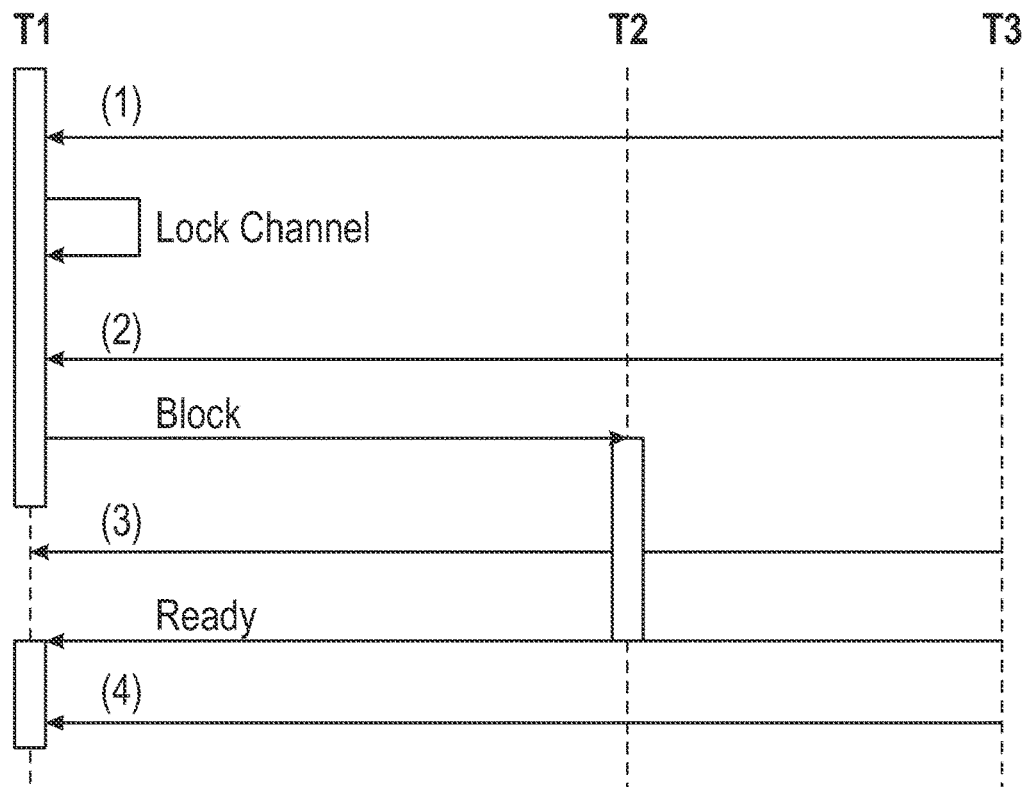
FIG. 7 is a flow diagram of an example sequence relating to unexpected events, according to some examples.

As shown in FIG. 7, the unexpected event, e.g., T3 informing T1 that T1 is to destroy itself, can arrive at different phases, marked as (1), (2), (3), or (4) in FIG. 7 within the handler of the MsgSend( ) call. The action to be taken depends on the phase at which the unexpected event arrived.

If the unexpected event arrived in phase (1), before a channel lock for channel C is acquired, T1 should not block waiting for T2 to reply, but if T1 blocks on that lock (a mutex of the scheduling executive 120) T1 should not wake up prematurely, to avoid damage to kernel data structures. A channel lock is used to serialize all access to a channel object and any connection on the channel.

If the unexpected event arrived in phase (2), before blocking on a reply, the call to block should return immediately. T1 should recognize that the blocking call returned without the call completing and return to its user persona.

If the unexpected event arrived in phase (3), while the thread T1 is blocked, depending on whether T1 is send- or reply-blocked, T1 should be made ready. T1 should then proceed to clean up after itself, for example by removing itself from any queue on which T1 is currently linked.

If the unexpected event arrived in phase (4), after T1 has unblocked, there is nothing to do, the call should proceed to its end.

Not only is it not easy for T3 to determine at which phase T1 is, that phase may change while T3 makes that determination.

Note the difference between T2 and T3 in this scenario, which demonstrates the distinction between handling expected events and handling unexpected ones. T2 only becomes aware of T1, via a receive identifier (ID), once T1 has declared itself as waiting for a reply. Consequently, T2 will not attempt to unblock T1 before T1 has started waiting. Furthermore, T2 loses sight of T1 once T1 replies, and T2 will not attempt to change T1's state afterwards. By contrast, T3 may try to change T1's state at any time.

5.2 Thread States

In some examples, a thread state machine includes four basic states among which a thread can transition: (1) active, in which the thread is running on a processor, (2) ready, in which the thread is on the ready queue of a cluster, (3) blocked, in which the thread cannot run as the thread is waiting on an event, and (4) mutex, in which the thread cannot run as the thread is waiting on a mutex.

These basic states are further divided into sub-states, based on the following criteria: (a) whether the thread is waiting for an event, (b) whether the thread is waiting for a mutex, or (c) whether the thread has a pending cancellation for any reason (signal, timeout, etc.). The concept of "cancellation" is discussed in further detail in Section 5.3 below.

The distinction between waiting and blocking, described above, allows for a thread to be waiting on an event E while still running on a processor, i.e., while the thread is in the active basic state. Such a thread would be in an active/wait (E) state. If the thread is preempted in active/wait(E) state then the basic state would become ready, but the thread is still waiting for the event E, and thus the thread is in a ready/wait(E) state.

While waiting for a mutex can be considered as a simple case of waiting for an event, the scheduling executive 120 considers waiting and blocking for these locks as separate states. There are two main reasons for treating mutexes separately. First, the mutex state is not cancellable, and a thread waiting for a mutex cannot abort the operation without risking damage to OS kernel data structures which the mutex protects.

Second, there are cases in which a mutex has to be locked after a thread has already declared itself as waiting for an event E. A thread cannot wait on two events at the same time, which means that mutexes have to be treated as independent of other events.

In some examples, the transition from waiting on a mutex to the mutex state is almost instantaneous. The state transitions according to some implementations of the present disclosure do not have to consider the case of a thread first declaring itself as waiting on a mutex and then also declaring itself as waiting for an event.

In some examples, every state machine transition is the result of one of the following operations:

Schedule,

Wait (either for an event E or a mutex M),

Block,

Unblock (with a matching event E, or a non-matching E),

Cancel, and

Preempt.

Figure 8:
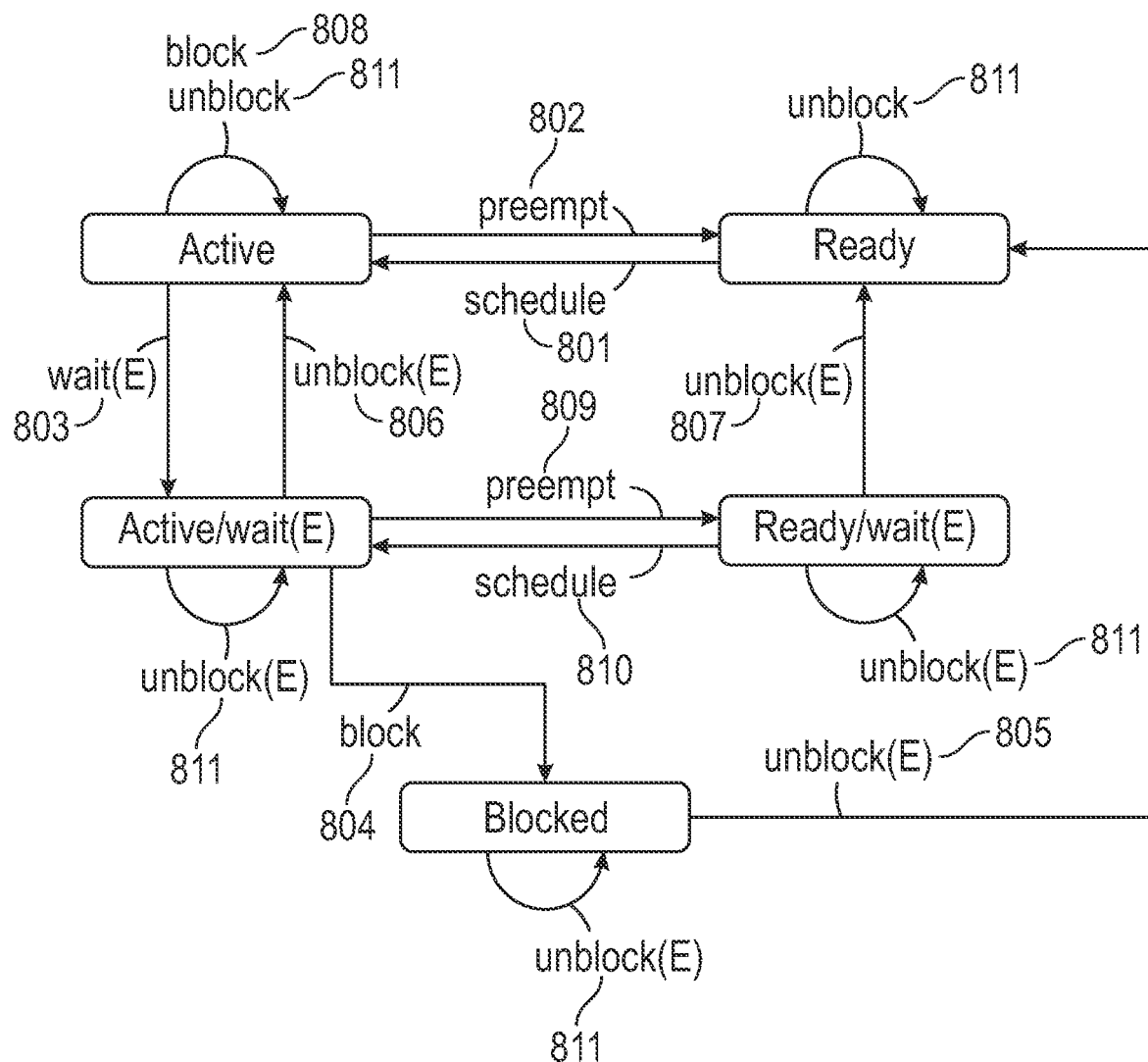
FIGS. 8 and 9 are state diagrams of state machines relating to states of threads, according to some examples.

FIG. 8 depicts a part of the state machine and shows the transitions resulting from common operations performed by code running in the context of the micro-kernel 118. The following is a list of state transitions, matching the numbering in FIG. 8.

801: A processor makes a scheduling decision (by an instance of the scheduling executive 120 executing on the processor) and dequeues a thread in the ready state from a queue of one of the thread's clusters. The thread transitions from the ready state to the active state.

802: A thread in the active state executes in either a user persona or a kernel persona. An interrupt occurs, and a higher priority thread is made ready by the interrupt handler. Due to a preempt operation, the thread is switched from the active state to the ready state and put on the ready queue for its cluster. Alternatively, a thread in the active state makes an explicit call to yield the processor to another thread at the same priority.

803: A thread in the active state executes in its kernel persona. The kernel code (of the thread) determines that the thread is to wait for an event E. The kernel code makes a call to the scheduling executive 120 to inform the scheduling executive 120 of this change, and the thread transitions from the active state to the active/wait(E) state.

804: A thread in the active/wait(E) state, having declared itself as waiting for event E, invokes a call to the scheduling executive 120 to block itself, and the thread transitions from the active/wait(E) state to the blocked state.

805: A thread T2 delivering event E, having established that thread T1 is waiting for E, invokes a call to the scheduling executive 120 to unblock T1. Since T1 is in the blocked state and is waiting for E, T1 transitions from the blocked state to the ready state.

806: Same as 805, but T1 has not yet blocked itself and is in the active/wait(E) state (i.e., T1 and T2 are executing in parallel on different processors). The call by T2 to unblock T1 transitions T1 from the active/wait(E) state to the active state.

807: Same as 806, but T1 is in the ready/wait(E) state and has been preempted. The call by T2 to unblock T1 transitions T1 from the ready/wait(E) state to the ready state.

808: A thread in the active state attempts to block. This typically happens after transition 806 has consumed the wait state. Since the thread is no longer waiting for an even it remains in the active state.

809: A thread in the active/wait(E) state is preempted, which causes the thread to transition from the active/wait(E) state to the ready/wait(E) state.

810: A thread in the ready/wait(E) state is rescheduled, which causes the thread to transition from the ready/wait(E) state to the active/wait(E) state.

811: A thread is unblocked for an event the thread is not waiting on. Such a transition should typically not occur in well-behaved code. The state of the thread is not changed in this case.

Two important properties of the state machine can be seen in the description above: (1) a thread can only block itself, and only after declaring that the thread is waiting for an event—the only transition to the blocked state is from the active/wait(E) state; and (2) a thread can be unblocked by another thread.

Note that the transition to the blocked state can only be performed when a thread is in its kernel persona.

The second property above (a thread can be unblocked by another thread), combined with not using a single kernel lock, can result in a race condition, where thread T1 is unblocked by thread T2 before T1 traps into the scheduling executive 120 to transition T1 to the blocked state. For example, thread T1 sends a message on a channel. T1 finds thread T2 receive-blocked on that channel and unblocks thread T2. Before T1 has a chance to block itself T1 is preempted and T2 is allowed to run for a period that is sufficient for T2 to reply to the message. Consequently, T2 attempts to make T1 ready before T1 has ever transitioned to the blocked state.

A similar condition can occur with mutexes. Thread T1 attempts to lock a mutex owned by T2. The compare-and-swap operation fails. T1 adds itself to the waiting list for the mutex and releases the spin lock. However, just before the scheduling executive 120 transitions the thread to the mutex state, T2, running on another processor, releases the mutex, and having found T1 at the head of the waiting list, attempts to make T1 ready.

These race conditions are handled by the thread state machine as follows:
1. The unblock state transition enacted by T2 consumes the waiting part of T1's 's state: if T1 is in the active/wait(E) state then T1 transitions to the active state 806 in FIG. 8. If T1 is in the ready/wait(E) state then T1 transitions to the ready state (807 in FIG. 8).
2. The block state transition enacted by T1 on itself only transitions T1 to the blocked state (804 in FIG. 8) if T1 is waiting for an event (in the active/wait(E) state).

Mutexes are handled in a similar way. Thus, in the mutex scenario above, T2 finds T1 at the head of the mutex waiting list, removes T1 and transitions T1's state to the active state. When the scheduling executive 120 attempts to transition T1 to the mutex state, the scheduling executive 120 finds that T1 is no longer waiting on the mutex. The active state is maintained and no scheduling change occurs.

5.3 Cancellation

The handling of unexpected events is divided between a source thread (i.e., the thread delivering the event) and a destination thread. The division is uneven, with the destination thread expected to perform most of the work, restricting the source thread to two basic actions: (1) notify the destination thread of the event, and (2) ready the destination thread if the destination thread is blocked, and prevent the destination thread from blocking again within the same kernel call.

Action (1) is performed by setting an asynchronous flag on the destination thread. Action (2), referred to as cancellation, is performed by issuing a call to the scheduling executive 120, which applies state transitions on the thread, as described in Section 5.2 above.

The following are some principles related to cancellation.

Every call that can block indefinitely from the OS kernel's own perspective should be a cancellation point. This includes all cases of blocking OS kernel calls.

The only non-cancellable blocking call is that performed to block on a mutex. The scheduling executive 120 handles that by using a separate thread state (mutex state).

An unexpected event should notify the destination thread of a pending cancellation.

An unexpected event should only ready a thread that is blocked on a cancellation point.

When a thread makes a blocking call, the call should abort if and only if the call is declared as a cancellation point and a cancellation is pending.

A pending cancellation persists until the end of the kernel call. That means that if there are two or more indefinite blocking calls within the same kernel call then all should be aborted.

Cancellation has no immediate effect if the thread is running in its user persona. In cases where cancellation is performed on a thread in its user persona that requires some action by the thread (e.g., signal delivery), the cancellation is considered as pending until the next time the thread switches back to its user persona.

A pending cancellation can be considered as part of the thread's state. However, due to the additional race conditions described above, the pending cancellation indicator (a set of asynchronous flags) is kept separate from the thread's state field.

When thread T1 handles an unexpected event and determines that thread T2 is to be notified of a pending cancellation, T1 performs the following operations: (a) atomically set an asynchronous flag on T2, ensuring that the asynchronous flag is observed by all processors 102, (b) check whether T2 is in a cancellable blocked state, and (c) if T2 is in a cancellable blocked state, ready T2.

Conversely, when T2 attempts to block itself and the blocking state is cancellable, T2 checks whether the asynchronous flag is set. If the asynchronous flag is set, T2 maintains its current state and does not block.

Figure 9:
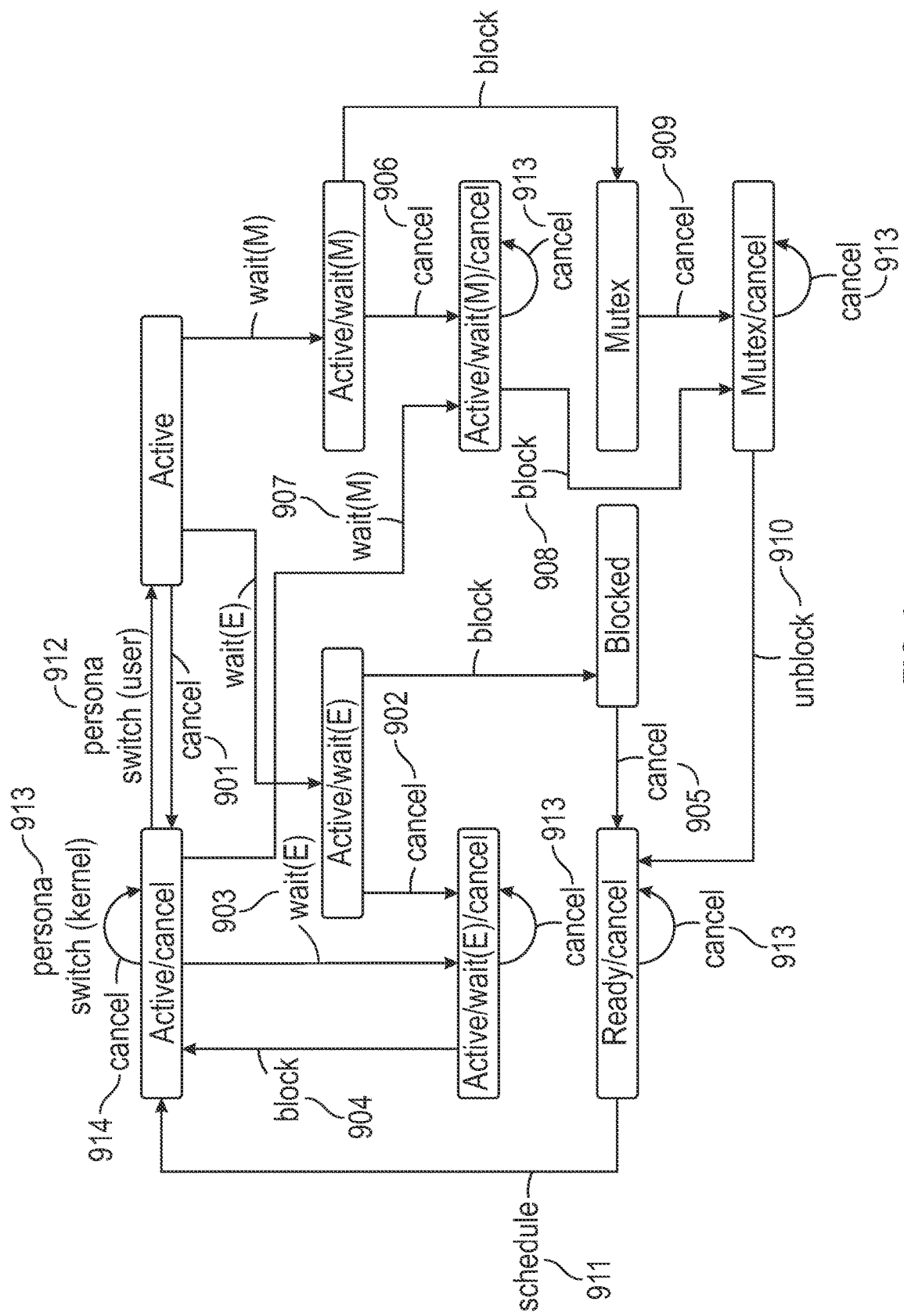

FIG. 9 shows states and transitions of a thread related to the handling of cancellations as a result of the arrival of unexpected events.

901: The thread is in the active state while executing in its kernel persona. A cancellation is registered, which causes the thread to transition from the active state to the active/cancel state.

902: Same as 901, but the thread is already waiting for an event E and is in the active/wait(E) state. In response to the cancellation, the thread transitions from the active/wait(E) state to the active/wait(E)/cancel state.

903: If the thread is in the active/cancel state (after being cancelled), and the thread starts waiting for E, the thread transitions from the active/cancel state to the active/wait(E)/cancel state.

904: A thread that is waiting for an event E and has pending cancellation (the thread is in the active/wait(E)/ cancel state) attempts to block. Due to the pending cancellation the thread does not change to the blocked state but instead transitions from the active/wait(E)/cancel state to the active/cancel state. Note that the waiting part of the state has been consumed, but that the pending cancellation persists, in case the thread attempts to block again within the same kernel call.

905: A thread that is in the blocked state, waiting for event E, is cancelled. The thread transitions from the blocked state to the read/cancel state. The cancellation is registered.

906: A thread that is active and is waiting for a mutex (i.e., the thread is in the active/wait(M) state) is cancelled. The cancellation is registered, and the thread transitions from the active/wait(M) state to the active/wait(M)/cancel state.

907: A thread that is active and cancelled (active/cancel state) starts waiting for a mutex, which causes the thread to transition from the active/cancel state to the active/wait(M)/cancel state.

908: A thread waiting for a mutex with pending cancellation (active/wait(M)/cancel state) blocks itself. Since mutexes are not subject to cancellation, the thread transitions from the active/wait(M)/cancel state to the mutex/cancel state, where the thread remembers the pending cancellation.

909: If the thread is in the mutex state and is cancelled, the thread transitions from the mutex state to the mutex/cancel state.

910: A thread in the mutex/cancel state (waiting on a mutex with a pending cancellation) is unblocked because the thread has acquired the mutex. In response, the thread transitions from the mutex/cancel state to the ready/cancel state, where the cancellation is still pending.

911: A thread that is in the ready/cancel state (the thread is ready but there is a pending cancellation) is scheduled, which causes the thread to transition from the ready/cancel state to the active/cancel state, where the cancellation is still pending.

912: A thread in the active/cancel state (active with a pending cancellation) switches to its user persona, which causes the cancellation to be dropped, and causes the thread to transition from the active/cancel state to the active state.

913: A thread switches to its kernel persona while a cancellation is pending. The thread remains in the active/cancel state, with the cancellation still pending. Note however that in most cases an inter-process interrupt should reach the thread before the thread makes the switch.

914: Note that cancellation is cumulative. For example, a thread may be cancelled due to a signal after it has already been cancelled as a result of a timeout.

The dropping of cancellation as part of a switch to the user persona is sometimes accompanied by specific handling that depends on the unexpected event. For example, a pending cancellation due to a signal may result in the thread executing a signal handler. Note that the thread does not have to switch to the kernel persona first—the signal may arrive while the thread is executing in its user persona. In that case, rescheduling due to an inter-processor interrupt ensures that the thread is eventually put back into execution in its user persona, at which point the event is handled and the pending cancellation dropped. Conversely, a thread executing in its user persona that switches to the kernel persona carries the pending cancellation according to the rules of the state machine.

In some examples, a kernel scheduler (e.g., the scheduling executive 120 discussed above) receives a first indication (e.g., in the form of a kernel call from a first thread) that the first thread is to wait for an event, where the first thread has transitioned to a wait state (e.g., the active/wait(E) state in FIG. 8) while the first thread remains active.

The kernel scheduler receives a second indication that the first thread has transitioned to a blocked state (e.g., the blocked state in FIG. 8) in which the first thread is blocked on the event.

The kernel scheduler receives a third indication from a second thread delivering the event, the third indication to unblock the first thread. In FIG. 8, the third indication is in the form of an unblock call.

In response to the third indication, the kernel scheduler causes a transition of the first thread from the wait state to an active state (e.g., transition 806 in FIG. 8) if the first thread is in the wait state and has not yet transitioned to the blocked state, and causes a transition of the first thread from the blocked state to a ready state (e.g., transition 805 in FIG. 8) if the first thread is in the blocked state.

In some examples, a time interval exists between when the first thread is in the wait state and when the first thread has transitioned to the blocked state.

In some examples, the first thread is to transition from the wait state to the blocked state (e.g., transition 804 in FIG. 8), and is unable to transition directly from the active state to the blocked state.

In some examples, the first thread is to initiate the transition from the wait state to the blocked state in response to the first thread determining that the first thread is still waiting on the event.

In some examples, the first thread has a user persona and a kernel persona, and the first thread is to transition to the blocked state while the first thread executes in the kernel persona.

In some examples, the kernel scheduler is to preempt the first thread while the first thread is in the wait state, and cause a transition of the first thread from the wait state to a ready, wait state (e.g., transition 809 in FIG. 8).

In some examples, the kernel scheduler is to, in response to the third indication, cause the first thread to transition from the ready, wait state to a ready state (e.g., transition 807 in FIG. 8) if the first thread has transitioned to the ready, wait state.

In some examples, the kernel scheduler is to receive, from the first thread, a fourth indication that the first thread is waiting on a mutex of the kernel scheduler, and in response to the fourth indication, cause a transition of the first thread to a mutex wait state while the first thread remains active, where the first thread is to transition from the mutex wait state to a mutex blocked state (e.g., as shown in FIG. 9) in which the first thread blocks on the mutex.

In some examples, the kernel scheduler is to receive a fifth indication from a further thread to release the mutex. In response to the fifth indication, the kernel scheduler is to cause a transition of the first thread from the mutex wait state to the active state if the first thread is in the mutex wait state and has not yet transitioned to the mutex blocked state, and cause a transition of the first thread from the mutex blocked state to the ready state if the first thread is in the mutex blocked state.

In some examples, a third thread is to set an indicator (e.g., an asynchronous flag as discussed above) associated with the first thread to indicate a cancellation of the first thread's waiting or blocking on the event, where the cancellation is triggered by an occurrence of another event (e.g., an unexpected event). In some examples, with the indicator set, the first thread is prevented from transitioning to the blocked state if the first thread has not yet transitioned to the blocked state.

In some examples, the kernel scheduler is to cause a transition of the first thread from the blocked state to a ready, cancel state (e.g., transition 905 in FIG. 9) in response to the setting of the indicator to indicate the cancellation, where in the ready, cancel state the cancellation is pending.

In some examples, if the first thread has transitioned to a state that waits or blocks on a mutex of the kernel scheduler, the first thread is not subject to the cancellation.

In some examples, the kernel scheduler is to drop the cancellation in response to the first thread switching from a kernel persona to a user persona (e.g., transition 912 in FIG. 9).

In some examples, a transition of a thread between different states occurs using a per-thread lock.

6. Interrupts

An interrupt is an asynchronous exception, which can be raised by a processor 102 in response to activity of an external device or another entity.

Figure 10:
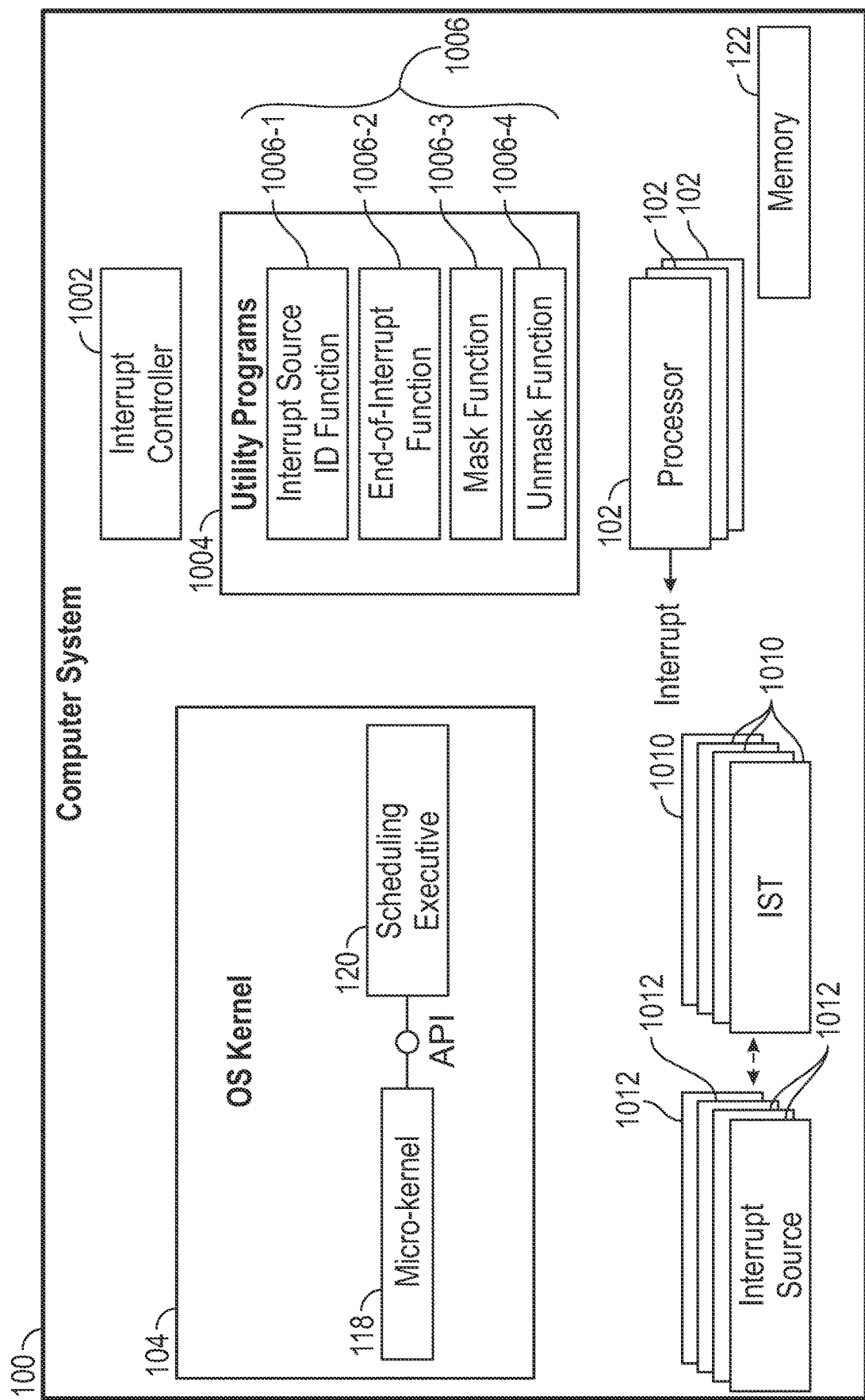
FIG. 10 is a block diagram of a computer system including interrupt handling mechanisms according to some examples.

In accordance with some implementations of the present disclosure, instead of using interrupt service routines (ISRs) run at a at a highest privilege level of a processor 102, interrupt service threads (ISTs) 1010 are used instead to handle interrupts, as shown in FIG. 10. The ISTs 1010 are subject to scheduling by the scheduling executive 120 (along with other threads in the manner discussed further above). Handling an interrupt by an IST 1010 refers to the IST 1010 performing designated actions in response to the interrupt, where the designated actions can differ depending upon the type of interrupt (e.g., the interrupt source 1012).

The scheduling executive 120 does not employ user-installed ISRs. No user code is allowed to execute in the context of an interrupt exception handler. This is due to ISRs being inherently unsafe. An ISR can execute arbitrary code at the highest privilege level of a processor 102. Such code has complete access to memory and peripheral devices of the computer system 100, which makes the code equivalent of an OS kernel.

ISRs are treated with a higher priority than any thread. Thus, an ISR of a logically lower priority peripheral device can delay the execution of a higher priority thread indefinitely.

The ban on use of ISRs in the scheduling executive 120 extends also to the micro-kernel 118. For example, both the clock handler, which is responsible for firing expired software timers, and the inter-processor interrupt (IPI) handler, of the micro-kernel 118 execute in the context of high-priority ISTs, and do not use ISRs.

Use of ISTs instead of ISRs is enabled by the fact that the scheduling executive 120 ensures low-latency scheduling of threads, as even the micro-kernel 118 is fully preemptable.

Referring to FIG. 10, when the processor 102 signals an interrupt the processor 102 jumps to the entry point for interrupt handling. From there the OS kernel 104 is expected to identify a source of the interrupt (an interrupt source 1012) by querying an interrupt controller 1002, handle the interrupt, and indicate to the interrupt controller 1002 that the OS kernel 104 has completed the interrupt handling.

Additionally, the OS kernel 104 may have to block the interrupt source, which is an operation referred to as "masking." In some examples, utility programs 1004 may be provided that include interrupt-related functions 1006 to handle interrupt-related operations. The utility programs 1004 may be specifically designed for a hardware arrangement (e.g., circuit board) of the computer system 100. As examples, the interrupt-related functions 1006 of the utility programs 1004 can include an interrupt source identification function 1006-1 to identify an interrupt source, an end-of-interrupt function 1006-2 to indicate that the OS kernel 104 has completed interrupt handling for the interrupt, a mask function 1006-3 to block the interrupt source, and an unmask function 1006-4 to resume handling of the interrupt source. The interrupt-related functions 1006 can be executed by the interrupt controller 1002 or by another processing device.

Each device driver in the computer system 100 that has to service an interrupt registers an IST, which is also associated internally with an interrupt semaphore. A device driver is associated with a peripheral device in the computer system 100, and the device driver controls an operation of the peripheral device.

6.1 Interrupt Handling

The handling of an interrupt by the scheduling executive 120 includes a short sequence that identifies the interrupt source 1012, finds all ISTs 1010 that are associated with the interrupt source 1012, and signals all interrupt semaphores linked to these ISTs 1010. In most cases, only one IST 1010 is associated with an interrupt source 1012. However, the scheduling executive 120 according to some examples allows several ISTs 1010 to be associated with a single interrupt source 1012. The maximum number of ISTs 1010 per interrupt source 1012 may be configured (e.g., 32 or a different number).

If an IST 1010 is currently waiting on an interrupt semaphore then the IST 1010 is made ready and scheduled according to its scheduling parameters (priority and cluster association as would be the case with other threads in the computer system 100) by the scheduling executive 120.

6.2 ISTs

An IST is a regular thread that has been associated with an interrupt via a call to the OS kernel 104, e.g., InterruptAttachThread( ). The IST is then expected to wait on the interrupt, which internally issues a direct call to the scheduling executive 120 to block the IST on its interrupt semaphore. The call returns as soon as the interrupt semaphore's count becomes greater than zero. No blocking occurs if the count is greater than zero when the call is made. The call may also return as a result of an unexpected event (e.g., timeout, signal, etc.). The interrupt semaphore's count increments with each signaling of the interrupt semaphore by the scheduling executive 120 in response to an interrupt from the corresponding interrupt source.

It is possible to associate more than one IST 1010 with any given interrupt source 1012. In this case the interrupt semaphore associated with each IST 1010 is signaled when the interrupt from the interrupt source 1012 fires, resulting in any such IST 1010 currently blocked on its interrupt semaphore to become ready. Note, however, that it is not possible to associate an IST 1010 with more than one interrupt source.

The priority of each IST is at the discretion of the system integrator. ISTs do not inherently have a higher priority than any other thread in the computer system 100. In fact, in some cases, an IST may have a priority that is lower than another thread in the computer system 100.

An IST with the kernel persona only (referred to as an "interrupt event thread") behaves the same as a normal IST, except that when the interrupt event thread is unblocked the interrupt event thread runs the kernel code to dispatch the event and then blocks again. An interrupt event thread counts as a thread in the process that made the InterruptAttachEvent( ) call, even though the interrupt event thread never executes in its user persona. The interrupt event thread exists either until the process exits, or until the interrupt with which the interrupt event thread is associated is detached.

6.3 Example Interrupt Handling Sequence

Figure 11:
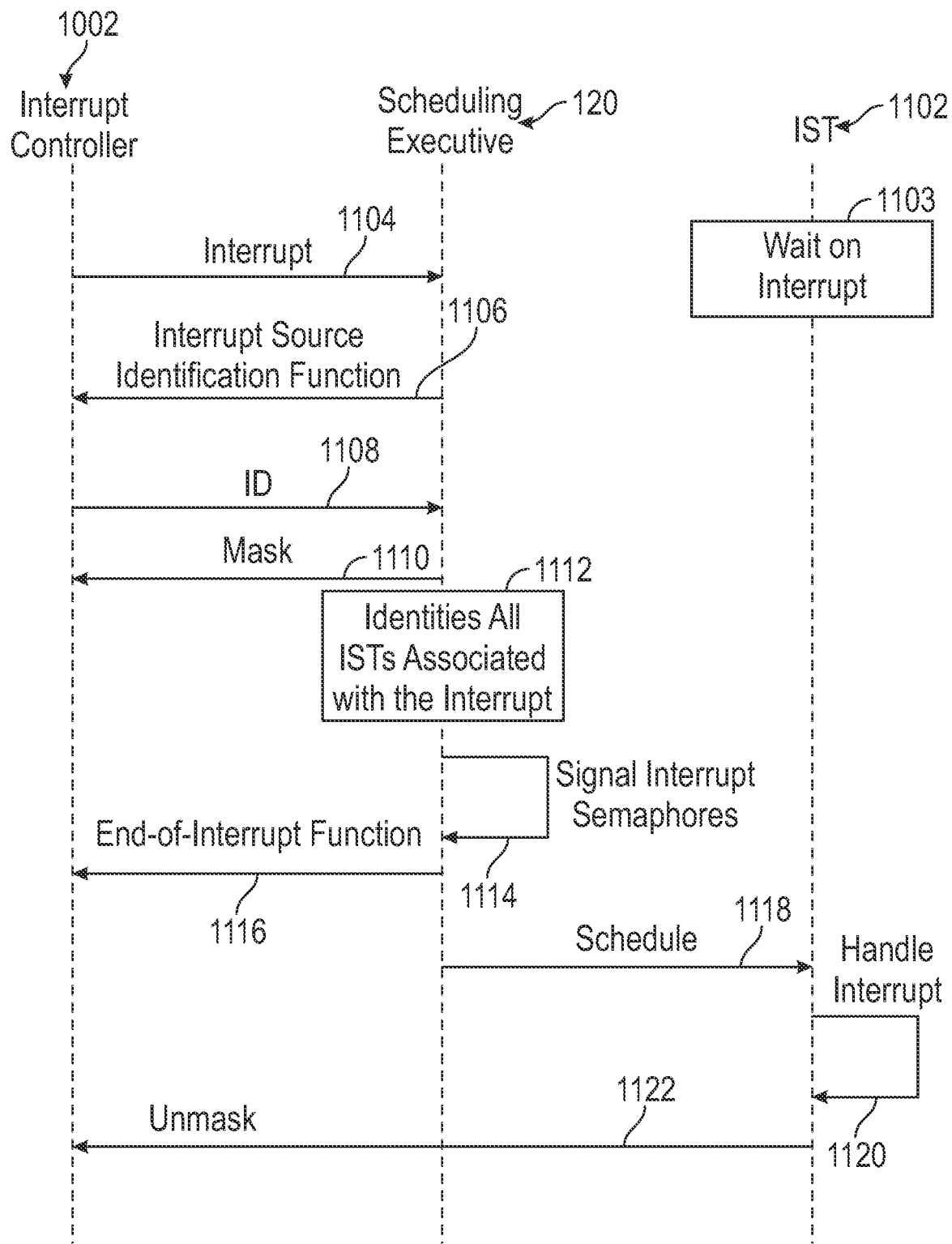
FIG. 11 is a flow diagram of an interrupt processing sequence according to some examples.

An example sequence for handling an interrupt is depicted in FIG. 11. The sequence includes actions of the interrupt controller 1002, the scheduling executive 120, and an IST 1102. The IST 1102 waits (at 1103) on an interrupt from a particular interrupt source—i.e., the IST 1102 does not perform any action until the interrupt occurs.

The interrupt controller 1002 asserts (at 1104) an interrupt 1104 for the interrupt source, by signaling the processor, which then switches to a privileged mode and starts execution from a known location. The OS kernel 124 installs the entry to its interrupt handling code at that location.

The scheduling executive 120 stores register values in a register area of an interrupted thread. The scheduling executive 120 invokes (at 1106) the interrupt source identification function 1006-1 for identifying the interrupt source. In response, the source identification function 1006-1, which runs on the processor, queries the interrupt controller 1002 for the identifier (ID) of the interrupt source. Once obtained, the source identification function 1006-1 returns (at 1108) the ID of the interrupt source.

The scheduling executive 120 masks (at 1110) the interrupt source in the interrupt controller 1002, by invoking the mask function 1006-3, for example. This ensures that an interrupt from the interrupt source is not re-asserted before end of the interrupt handling.

The scheduling executive 120 identifies (at 1112) all ISTs associated with the interrupt, and signals (at 1114) interrupt semaphores associated with the ISTs.

Any IST currently blocked on its associated interrupt semaphore (based on the signaling by the scheduling executive 120) is moved to the ready state and placed on its cluster's ready queue (e.g., as shown in FIG. 5).

When the scheduling executive 120 completes its interrupt processing, the scheduling executive 120 invokes (at 1116) the end-of-interrupt function 1006-2.

If an active thread was preempted, then the scheduling executive 120 performs a scheduling decision (at 1118) to select a new IST (e.g., 1102 in FIG. 11) to run. The scheduling executive 120 places the selected IST 1102 into execution to handle (at 1120) the interrupt. The scheduling executive 120 switches the processor mode to start running the selected IST 1102.

Note that when the scheduling executive 120 exits the interrupt is still masked. Each IST associated with the interrupt is responsible for unmasking the interrupt (at 1122), by invoking the unmask function 1006-4.

6.4 Masking and Unmasking

The scheduling executive 120 masks an interrupt as soon as the interrupt arrives. This prevents a flood of interrupts until the relevant IST or ISTs perform the interrupt-specific handling. The interrupt mask count is incremented for each IST associated with that interrupt, which means that the interrupt is unmasked in the controller only after the matching number of calls to unmask the interrupt are made by the ISTs (typically one call from each IST).

6.5 Multi-Processor Support

The scheduling executive 120 supports the routing of interrupts to any processor 102 managed by the OS. The exception is processor-specific interrupts, such as inter-processor interrupts (IPIs) and clock interrupts.

The interrupt identification phase of interrupt handling is responsible for the disambiguation of processor-specific interrupts that share the same external identifier. In this case the IST is associated with the processor-specific cluster for the target processor when the attach kernel call is invoked and on any call to mask or unmask an interrupt. While such an IST can perform other work while running on a different processor, it is expected that the cluster affinity will be permanent.

In some examples, a system (e.g., the computer system 100) includes an IST to handle an interrupt, and a kernel scheduler (e.g., the scheduling executive 120) to schedule the IST as part of a collection of threads (including non-IST threads) to be scheduled.

In some examples, the IST is associated with a priority, and the kernel scheduler is to schedule the IST for execution based on the priority associated with the IST and priorities associated with other threads in the collection of threads.

In some examples, the kernel scheduler is to receive, from an interrupt controller (e.g., 1002), a call responsive to the interrupt, which is a notification of the interrupt.

A storage medium used to store machine-readable instructions, such as the OS kernel or other programs, can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A system comprising:
   one or more hardware processors;
   a plurality of threads executable on the one or more hardware processors and comprising a first thread associated with an application program, and interrupt service threads to handle respective interrupts, wherein the plurality of threads are assigned respective priorities such that the first thread associated with the application program has a first priority that is higher than a second priority of a first interrupt service thread of the interrupt service threads, and the first priority of the first thread associated with the application program is lower than a third priority of a second interrupt service thread of the interrupt service threads; and a kernel scheduler executable on the one or more hardware processors to:
  determine the first priority of the first thread associated with the application program, and the second priority of the first interrupt service thread executed on a first hardware processor, and
  schedule the first thread and the first interrupt service thread based on the first priority and the second priority by preempting the first interrupt service thread to schedule the first thread for execution on the first hardware processor based on the first thread having the first priority that is higher than the second priority, wherein the preempting of the first interrupt service thread switches the first interrupt service thread from an active state to a ready state in which the first interrupt service thread is placed in a queue.

2. The system of claim 1, wherein the kernel scheduler is to:
  after the preempting, determine that a second hardware processor has become available, and migrate the first interrupt service thread from the first hardware processor to the second hardware processor based on the second hardware processor becoming available.

3. The system of claim 1, wherein interrupt service routines (ISRs) are not employed to handle the respective interrupts.

4. The system of claim 1, wherein the kernel scheduler is executable on the one or more hardware processors to:
  signal an interrupt semaphore associated with the first interrupt service thread, wherein the signaling of the interrupt semaphore increments a count of the interrupt semaphore, and wherein the first interrupt service thread previously blocked on the interrupt semaphore is unblocked based on the count of the interrupt semaphore being greater than zero.

5. The system of claim 1, wherein the kernel scheduler is executable on the one or more hardware processors to:
  in response to a notification of an interrupt, identify an interrupt source of the interrupt.

6. The system of claim 5, wherein the kernel scheduler is executable on the one or more hardware processors to identify the interrupt source of the interrupt by issuing a function executed by a processing device of the system.

7. The system of claim 5, wherein the kernel scheduler is executable on the one or more hardware processors to:
  in response to identifying the interrupt source, identify a plurality of interrupt service threads associated with the interrupt source.

8. The system of claim 7, wherein the kernel scheduler is executable on the one or more hardware processors to:
  signal semaphores associated with the identified plurality of interrupt service threads.

9. The system of claim 8, wherein the kernel scheduler is executable on the one or more hardware processors to:
  transition each interrupt service thread of the identified plurality of interrupt service threads blocked on an associated semaphore to a ready state for scheduling.

10. The system of claim 1, wherein the kernel scheduler is executable on the one or more hardware processors to:
  preempt a further thread having a further priority lower than the second priority, and
  responsive to the preemption of the further thread, schedule the first interrupt service thread for execution.

11. The system of claim 5, wherein the kernel scheduler is executable on the one or more hardware processors to mask the interrupt source while processing the interrupt from the interrupt source, and the first interrupt service thread is to unmask the interrupt source once the interrupt has been handled by the first interrupt service thread.

12. A method of a system comprising one or more hardware processors, comprising:
  receiving, by a scheduling executive of an operating system (OS) kernel executing on the one or more hardware processors, a call from a first thread of an application program, wherein the first thread has a first priority, and wherein the system comprises a plurality of threads comprising the first thread of the application program and interrupt service threads to handle respective interrupts, and wherein the plurality of threads are assigned respective priorities such that the first priority of the first thread of the application program is higher than a second priority of a first interrupt service thread of the interrupt service threads, and the first priority of the first thread of the application program is lower than a third priority of a second interrupt service thread of the interrupt service threads;
  associating the interrupt service threads with respective interrupt sources;
  receiving, by the scheduling executive executing on the one or more hardware processors, an indication of an interrupt from an interrupt source of the interrupt sources, wherein the first interrupt service thread is executable on a first hardware processor to handle the interrupt from the interrupt source; and
  scheduling, by the scheduling executive executing on the one or more hardware processors, the first thread having the first priority and the first interrupt service thread having the second priority, wherein the scheduling comprises preempting the first interrupt service thread with the first thread based on the first thread having the first priority that is higher than the second priority, and wherein the preempting of the first interrupt service thread switches the first interrupt service thread from an active state to a ready state in which the first interrupt service thread is placed in a queue containing threads to be scheduled by the scheduling executive for execution on the first hardware processor.

13. The method of claim 12, comprising, after the preempting,
  determining, by the scheduling executive executing on the one or more hardware processors, that a second hardware processor has become available, and
  migrating the first interrupt service thread from the first hardware processor to the second hardware processor based on the second hardware processor becoming available.

14. The method of claim 13, wherein the first thread is a non-interrupt service thread.

15. The method of claim 12, comprising:
  signaling, by the scheduling executive, an interrupt semaphore associated with the first interrupt service thread, wherein the signaling of the interrupt semaphore increments a count of the interrupt semaphore, and wherein the first interrupt service thread previously blocked on the interrupt semaphore is unblocked based on the count of the interrupt semaphore being greater than zero.

16. The method of claim 12, comprising:
  in response to a notification of the interrupt, identifying, by the scheduling executive, the interrupt source; and
  in response to identifying the interrupt source, identifying, by the scheduling executive, a plurality of interrupt service threads associated with the interrupt source.

17. The method of claim 16, comprising:
signaling, by the scheduling executive, semaphores associated with the identified plurality of interrupt service threads.

18. The method of claim 12, wherein interrupt service routines (ISRs) are not employed to handle the respective interrupts.

19. A non-transitory machine-readable storage medium comprising instructions that upon execution cause a system to:
receive, at a scheduling executive of an operating system (OS) kernel, a call from a non-interrupt service thread, wherein the non-interrupt service thread has a first priority, and wherein the system comprises a plurality of threads comprising the non-interrupt service thread and interrupt service threads, the interrupt service threads to handle respective interrupts, and wherein the plurality of threads are assigned respective priorities such that the first priority of the non-interrupt service thread is higher than a second priority of a first interrupt service thread of the interrupt service threads, and the first priority of the non-interrupt service thread is lower than a third priority of a second interrupt service thread of the interrupt service threads;
receive, at the scheduling executive, a notification of an interrupt from an interrupt source, wherein the interrupt is associated with the first interrupt service thread executable on a first hardware processor to handle the interrupt; and
schedule, at the scheduling executive, the non-interrupt service thread and the first interrupt service thread based on the first priority and the second priority, wherein the scheduling comprises preempting the first interrupt service thread with the non-interrupt service thread based on the non-interrupt service thread having the first priority that is higher than the second priority, and wherein the preempting of the first interrupt service thread switches the first interrupt service thread from an active state to a ready state in which the first interrupt service thread is placed in a queue containing threads to be scheduled by the scheduling executive for execution on the first hardware processor.

20. The non-transitory machine-readable storage medium of claim 19, wherein the instructions upon execution cause the system to:
after the preempting of the first interrupt service thread:
determine, at the scheduling executive, that a second hardware processor has become available, and
migrate the first interrupt service thread from the first hardware processor to the second hardware processor based on the second hardware processor becoming available, wherein the preempted first interrupt service thread is associated with a context comprising a register set and a stack area, and wherein the migrating of the first interrupt service thread comprises migrating the context from the first hardware processor to the second hardware processor.

* * * * *